(12) United States Patent
Jacobson et al.

(10) Patent No.: US 9,376,735 B2
(45) Date of Patent: Jun. 28, 2016

(54) METHODS AND SYSTEMS FOR RECOVERING RARE EARTH ELEMENTS

(71) Applicant: The University of Houston System, Houston, TX (US)

(72) Inventors: Allan J. Jacobson, Houston, TX (US); Pradeep Samarasekere, Houston, TX (US)

(73) Assignee: UNIVERSITY OF HOUSTON SYSTEM, Houston, TX (US)

( * ) Notice: Subject to any disclaimer, the term of this patent is extended or adjusted under 35 U.S.C. 154(b) by 102 days.

(21) Appl. No.: 14/211,120

(22) Filed: Mar. 14, 2014

(65) Prior Publication Data

US 2014/0311294 A1 Oct. 23, 2014

Related U.S. Application Data

(60) Provisional application No. 61/791,225, filed on Mar. 15, 2013.

(51) Int. Cl.
| | |
|---|---|
| C22B 59/00 | (2006.01) |
| C22B 7/00 | (2006.01) |
| C22B 3/00 | (2006.01) |
| C01G 56/00 | (2006.01) |
| C01G 1/02 | (2006.01) |
| B09B 3/00 | (2006.01) |
| B09B 5/00 | (2006.01) |
| C22B 3/32 | (2006.01) |

(52) U.S. Cl.
CPC ............... *C22B 59/00* (2013.01); *B09B 3/0016* (2013.01); *B09B 3/0083* (2013.01); *B09B 5/00* (2013.01); *C01G 1/02* (2013.01); *C01G 56/00* (2013.01); *C22B 3/0024* (2013.01); *C22B 7/006* (2013.01); *Y02P 10/234* (2015.11)

(58) Field of Classification Search
CPC ...... C22B 59/00; C22B 7/006; C22B 3/0024; B09B 3/0083; B09B 3/0016; C01G 1/02; C01G 56/00
See application file for complete search history.

(56) References Cited

U.S. PATENT DOCUMENTS

| | | | |
|---|---|---|---|
| 4,433,181 | A | 2/1984 | Holter |
| 2004/0139912 | A1 | 7/2004 | Tomasz Dwilinski et al. |

FOREIGN PATENT DOCUMENTS

| | | | |
|---|---|---|---|
| JP | 63-182216 A | | 7/1988 |
| JP | 03-207825 A | | 9/1991 |
| JP | 20042626978 A | * | 9/2004 |
| WO | 2012-149642 A1 | | 11/2012 |

OTHER PUBLICATIONS

Fujita et al. Japanese Patent 2004262978 A published Sep. 2004. Machine translation.*

(Continued)

*Primary Examiner* — George Wyszomierski
*Assistant Examiner* — Tima M McGuthry Banks
(74) *Attorney, Agent, or Firm* — Robert W. Strozier

(57) ABSTRACT

Methods and systems for recovering or extracting rare earth elements under mild conditions include subjecting a material including rare earth element to a rare earth element crystallization medium under solvothermal conditions sufficient to form rare earth element crystals capable of gravity separation and purification.

33 Claims, 21 Drawing Sheets

(56) References Cited

OTHER PUBLICATIONS

Journal of Wuhan University of Technolotgy—Mater. Sci. Ed. Aug. 2009, "Separation of Red ($Y2O3:Eu3+$), Blue ($BaMgAl10O17:Eu2+$) and Green ($CeMgAl10O17:Tb3$) Rare Earth Phosphors by Liquid/Liquid Extraction", Mei Guangjun, Rao Peng, Mitsuaki Matsuda, Toyohisa Fujita.

* cited by examiner

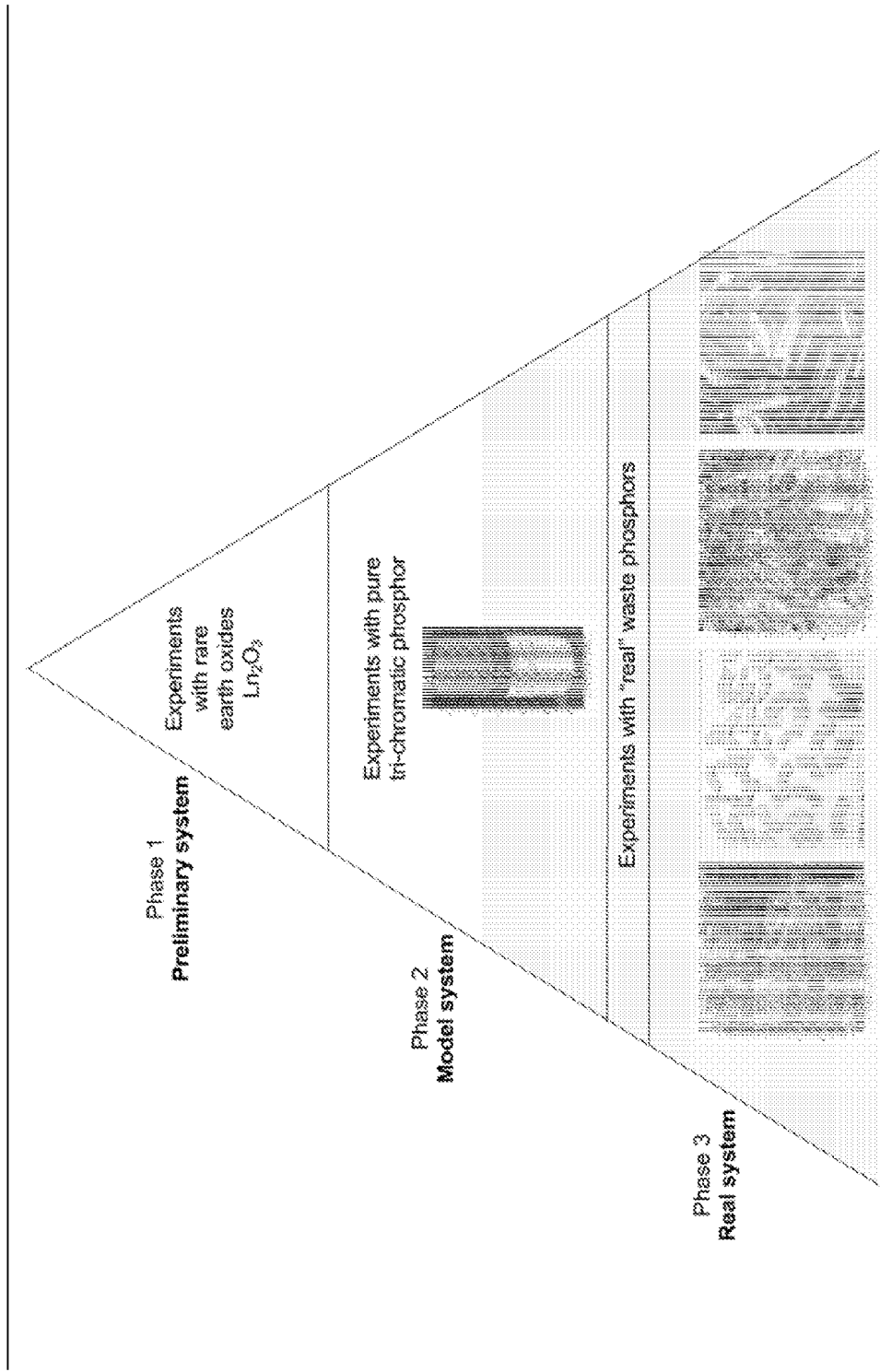

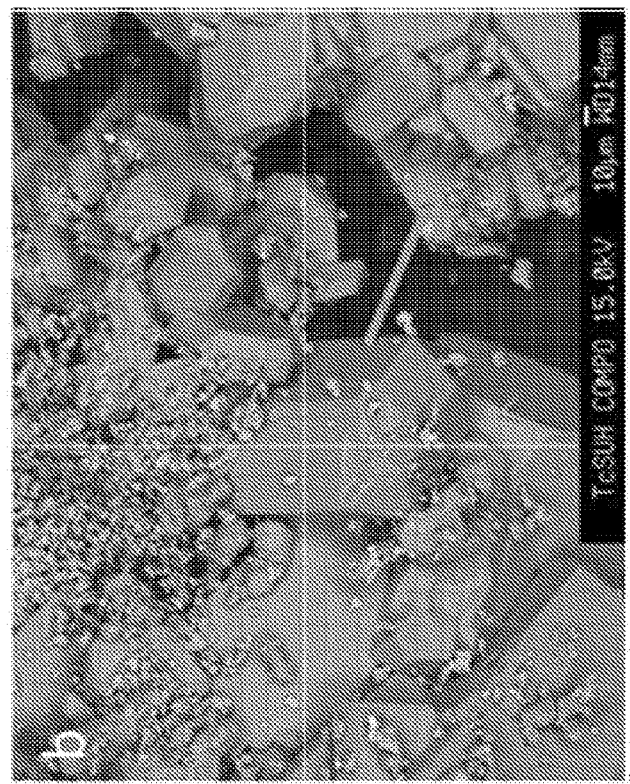
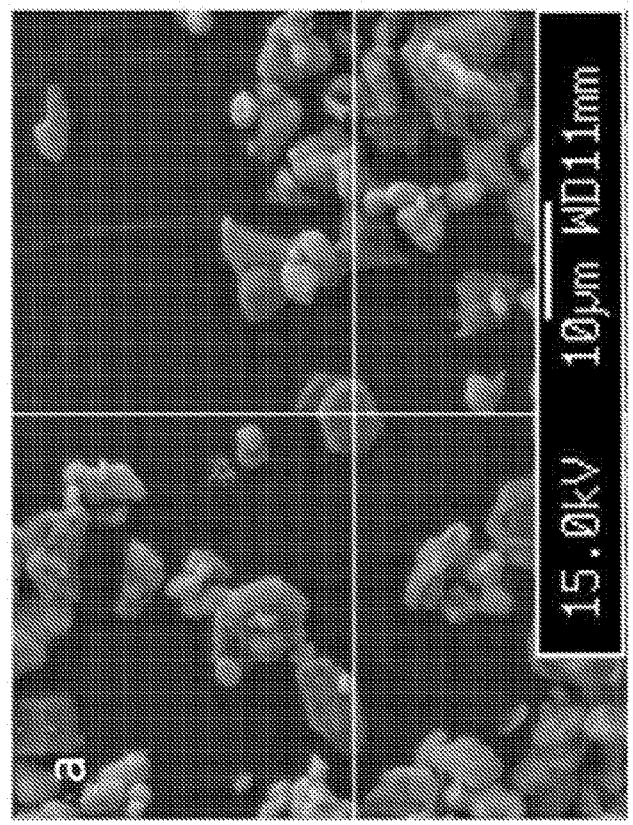
FIG. 5B
FIG. 5A

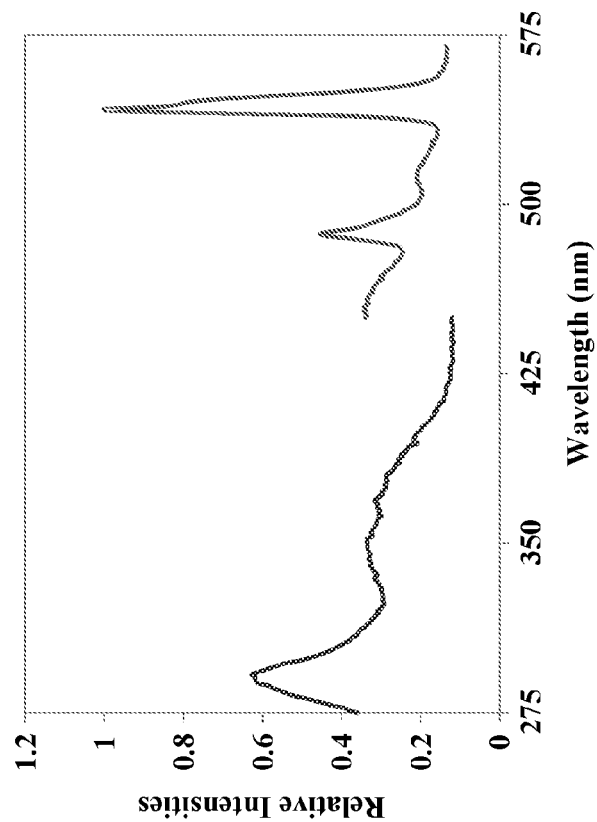
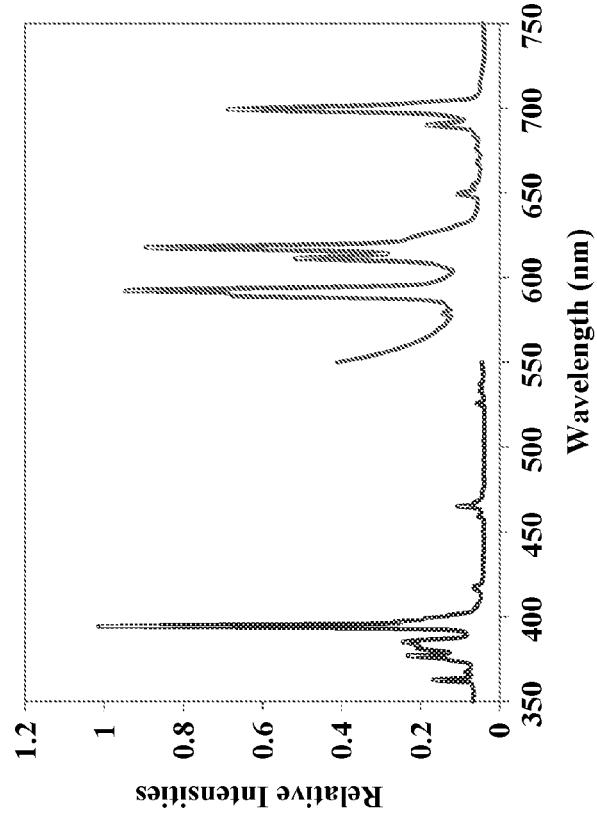
FIG. 7B
FIG. 7A

NdFeB Magnets from Hard Drives
Source : EPC recycling
Ni/Cu Coating Free, Ground
NdFeB Magnets
$(Nd_2Fe_{14}B)$
0.25 g
+
Formamide (10 mL)
+
$H_2O$ (0.25 mL)
+
Formic acid (0.25 mL)
Temperature: 100°C
Time: 72 h
pH : 6.0 - 6.5
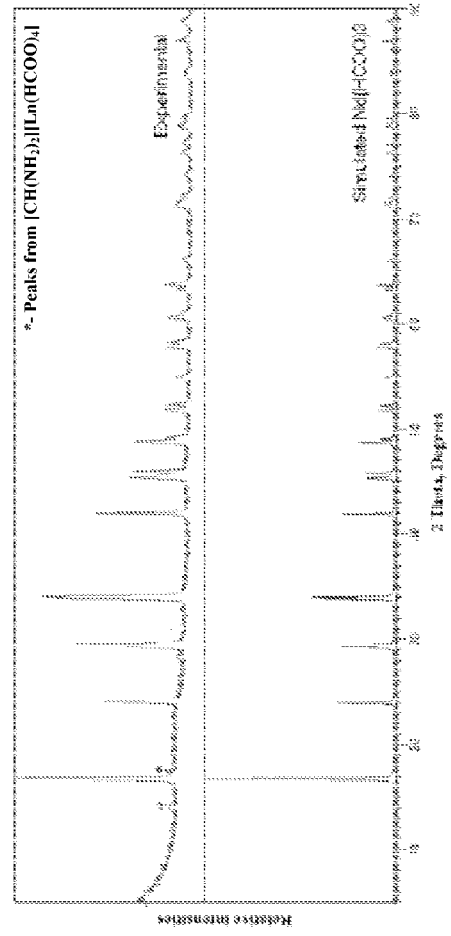
FIG. 19

METHODS AND SYSTEMS FOR RECOVERING RARE EARTH ELEMENTS

RELATED APPLICATIONS

This application claims priority to and the benefit of U.S. Provisional Patent Application Ser. No. 61/791,225, filed Mar. 15, 2013 (15 Mar. 2013).

BACKGROUND OF THE INVENTION

1. Field of the Invention

Embodiments of this invention relate to methods and systems for recovering rare earth elements from materials including rare earth element under mild conditions.

More particular, embodiments of this invention relate to methods and systems for recovering rare earth elements from materials including rare earth element under mild conditions, where the methods and systems include the use of a rare earth element crystallization medium under solvothermal conditions to form rare earth element crystals capable of gravity separation.

2. Description of the Related Art

The Department of Energy has issued recently two reports (Critical Materials Strategy 2010 and an update in 2011) outlining strategies to address critical materials challenges.[1,2] The critical materials research and development plan has three major components: diversifying supply, developing substitutes, and improving recycling. Of the fourteen specific elements identified as critical, eight are rare earth elements: lanthanum is a component of fluid catalytic cracking catalysts which are important in petroleum refining, neodymium and dysprosium are used in permanent magnets in wind turbine generators and electric vehicle motors, and cerium, europium, terbium and yttrium are used as phosphors for energy efficient fluorescent lights.

Rare earth metals, particularly lanthanum and cerium are important additives in fluid catalytic cracking catalysts used in petroleum refining to produce gasoline. Catalysts containing rare earths have higher selectivity to gasoline and greater stability in the high-temperature and steam environment associated with catalyst regeneration. The Department of Energy has made an estimate of the consumption of lanthanum oxide in fluid catalytic cracking (FCC). For an FCC unit processing 60,000 barrels/day of feedstock, the catalyst makeup rate to preserve catalyst activity is 4 tonsday.[2] Until recent, trends to lower rare earth metal content, typical FCC catalysts contained 3.5% rare earth oxide corresponding to 280 lb per day lanthanum oxide in the makeup catalyst. The total amount of rare earth metal oxides used in catalytic cracking catalysts was 27,000 tons in 2008 of which 66% was lanthanum oxide and 32% was cerium oxide. The other major catalytic use of cerium oxide is in automotive exhaust three-way catalysts for catalytic converters.

Today, spent catalysts are considered hazardous waste and are disposed of in landfills or used to make construction materials. The rare earth oxides are not recovered. The price for lanthanum oxide used has risen from $5 per kilogram in early 2010 to $140 per kilogram in June 2011, and consequently significant incentives exist either to recover rare earths from spent catalysts or to reduce their levels of use.

Most of the chemistry that has been investigated for rare earth recovery involves strong acid digestion of the spent materials followed by some form of solvent extraction of the rare earth component. The use of strong acids both in recycling and in the production of rare earth metals from minerals has significant associated waste disposal issues and adverse environmental impacts. As an example of approaches that have been tried previously, Kulkarni et al.[3] developed a method to dissolve rare earth elements from fluidized-bed catalytic cracking (FCC) catalysts that used a high temperature (200° C.), high pressure (200 psig), and acid digestion ($HNO_3$, HF and $H_3BO_3$). Other methods include leaching the metals using hydrochloric acid or nitric acid and then extracting La and Ce from the acid systems by extraction into an organic medium containing a complexing agent. Similar approaches have been used for extraction of rare earths from fluorescent lights or CRT phosphors. For example, Rabah used pressure leaching in sulfuric acid/nitric acid mixtures[4] and Shimizu et al. used supercritical carbon dioxide containing tri-n-butyl phosphate complexes in $HNO_3$ and $H_2O$ for extraction.[5]

Thus, there is a significant need in the art for new techniques and technology for the effective and efficient recovery of rare earth metals and/or oxides from spent catalysts and other waste sources without the need of strong acids.

SUMMARY OF THE INVENTION

Embodiments of this invention provide systems for recovering rare earth elements from a material containing rare earth elements including a temperature and pressure controlled vessel into which is added the material and a rare earth element crystallization medium under solvothermal conditions sufficient to selectively crystallize the rare earth elements to form a rare earth metal crystals capable of being separated from other solid materials. The systems also include a separator for separating the rare earth metal crystals from the material to form a purified rare earth metal crystalline composition. The crystallization medium comprises 80 vol. % to 100 vol. % of at least one amide, 0 vol. % to 10 vol. % of at least one organic acid, and 0 vol. % to 10 vol. % water. In certain embodiments, the separator is a gravity separator, while in other embodiments, the separator is a magnetic separator. Of course, it should be recognized that the separator may be any separator that gives rise to a complete or substantially complete separation of the rare earth element crystals from other solid materials. The systems may also include a purifying vessel for purifying the rare earth metal formate crystalline composition. The systems may also include a post-calcining vessel for converting the purified rare earth formate crystalline composition into purified rare earth oxides. The systems may also include a pre-calcining vessel for calcining the material prior to adding the material to the temperature and pressure controlled vessel. The amides are selected from the group consisting of formamide, N-carbylformamides, N,N-dicarbylformamides, or mixtures or combinations thereof, where the carbyl group are the same or different and are selected from the group consisting of linear or branched alkyl groups having between 1 and 6 carbon atoms, aryl groups, araalkyl groups, alkaaryl group, or mixture thereof and wherein the organic acids are selected from the group consisting of formic acid, acetic acid, propanoic acid and mixtures or combinations thereof.

Embodiments of this invention provide methods for recovering rare earth elements from a material including containing rare earth elements including adding the material and a rare earth element crystallization medium into a temperature and pressure controlled vessel under solvothermal conditions sufficient to selectively crystallize the rare earth elements to form a rare earth metal crystals capable of being gravity separated, where the crystallization medium comprises 80 vol. % to 100 vol. % of at least one amide, 0 vol. % to 10 vol. % of at least one organic acid, and 0 vol. % to 10 vol. % water.

The methods may also include gravity separating the rare earth metal crystals to form a rare earth crystalline solid composition. The methods may also include magnetically separating the rare earth metal crystals to form a rare earth crystalline solid composition. The methods may also include purifying the purified rare earth metal formate crystalline composition. The methods may also include post-calcining the purified rare earth crystalline composition into purified rare earth oxides. The methods may also include pre-calcining the material prior to adding the material to the temperature and pressure controlled vessel. The amides are selected from the group consisting of formamide, N-carbylformamides, N,N-dicarbylformamides, or mixtures or combinations thereof, where the carbyl group are the same or different and are selected from the group consisting of linear or branched alkyl groups having between 1 and 6 carbon atoms, aryl groups, araalkyl groups, alkaaryl group, or mixture thereof and wherein the organic acids are selected from the group consisting of formic acid, acetic acid, propanoic acid and mixtures or combinations thereof.

Embodiments of this invention provide methods for recovering rare earth elements from a material including containing rare earth elements including mixing the material with a rare earth element crystallization medium in a temperature and pressure controlled vessel under solvothermal conditions sufficient to selectively crystallize the rare earth elements to form a rare earth metal crystals capable of being gravity separated, and separating the rare earth metal crystals to form a rare earth crystalline solid composition, where the crystallization medium comprises 80 vol. % to 100 vol. % of at least one amide, 0 vol. % to 10 vol. % of at least one organic acid, and 0 vol. % to 10 vol. % water. The methods may also include purifying the purified rare earth metal formate crystalline composition. The methods may also include post-calcining the purified rare earth crystalline composition into purified rare earth oxides. The methods may also include pre-calcining the material prior to adding the material to the temperature and pressure controlled vessel. The amides are selected from the group consisting of formamide, N-carbylformamides, N,N-dicarbylformamides, or mixtures or combinations thereof, where the carbyl group are the same or different and are selected from the group consisting of linear or branched alkyl groups having between 1 and 6 carbon atoms, aryl groups, araalkyl groups, alkaaryl group, or mixture thereof and wherein the organic acids are selected from the group consisting of formic acid, acetic acid, propanoic acid and mixtures or combinations thereof.

Embodiments of this invention provide compositions for recovering rare earth elements from a material including containing rare earth elements including the material, a rare earth element crystallization medium, and rare earth metal crystals, where the crystallization medium comprises 80 vol. % to 100 vol. % of at least one amide, 0 vol. % to 10 vol. % of at least one organic acid, and 0 vol. % to 10 vol. % water. The amides are selected from the group consisting of formamide, N-carbylformamides, N,N-dicarbylformamides, or mixtures or combinations thereof, where the carbyl group are the same or different and are selected from the group consisting of linear or branched alkyl groups having between 1 and 6 carbon atoms, aryl groups, araalkyl groups, alkaaryl group, or mixture thereof and wherein the organic acids are selected from the group consisting of formic acid, acetic acid, propanoic acid and mixtures or combinations thereof.

Embodiments of this invention provide processes for recovering rare earth elements from CRT phosphors including obtaining CRT monitors, removing phosphor material from CRT lenses to form a powered phosphor material, and calcining the powered phosphor material to form a calcined phosphor material, which are pre-treatment steps for the removal process. The processes also include reacting the calcined phosphor material with a rare earth element crystallization medium, solid/liquid separating in a solid/liquid separator to form a solid material, separating the solid material in a solid/solid density separator using a density separation medium, and separating the solid material into a residual solid material and a rare earth element containing solid material, where the crystallization medium comprises 80 vol. % to 100 vol. % of at least one amide, 0 vol. % to 10 vol. % of at least one organic acid, and 0 vol. % to 10 vol. % water. The processes may also include separating the density separation medium into its constituents for reuse.

Embodiments of this invention provide processes for recovering rare earth elements from a mercury free waste phosphor material including obtaining a mercury free waste phosphor material, separating the mercury free waste phosphor material in a solid/solid density separator using a density separation medium into a rare earth element rich, mercury free waste phosphor material, and calcining the rare earth element rich, mercury free waste phosphor material to form a calcined rare earth element rich, mercury free waste phosphor material, which are pre-treatment steps to prepare the material for subsequent rare earth element removal. The processes also include reacting the calcined rare earth element rich, mercury free waste phosphor material with a rare earth element crystallization medium to form rare earth element crystals, solid/liquid separating in a solid/liquid separator to form a solid material, and separating the solid material in a solid/solid density separator using a density separation medium to form a rare earth element containing solid material, where the crystallization medium comprises 80 vol. % to 100 vol. % of at least one amide, 0 vol. % to 10 vol. % of at least one organic acid, and 0 vol. % to 10 vol. % water. The processes also may include separating the density separation medium into its constituents for reuse.

Embodiments of this invention provide processes for recovering rare earth elements from magnets including obtaining magnets for hard disk drives and comminuting the magnets to form a comminuted magnetic material, which are pre-treating steps to prepare the material for rare earth element removal or extraction. The processes also include reacting the comminuted magnetic material with a rare earth element crystallization medium to form rare earth element crystals, solid/liquid separating in a solid/liquid separator to form a solid material, separating the solid material in a solid/solid magnetic separator using a magnetic field to form a rare earth element containing solid material, where the crystallization medium comprises 80 vol. % to 100 vol. % of at least one amide, 0 vol. % to 10 vol. % of at least one organic acid, and 0 vol. % to 10 vol. % water.

Embodiments of this invention provide processes for recovering rare earth elements from magnets including obtaining NiMH batteries and comminuting the NiMH batteries to form a comminuted NiMH battery material, which are pre-treating steps to prepare the material for rare earth element removal or extraction. The processes also include reacting the comminuted NiMH battery material with a rare earth element crystallization medium to form rare earth element crystals, solid/liquid separating in a solid/liquid separator to form a solid material, separating the solid material in a solid/solid magnetic separator using a magnetic field to form a rare earth element containing solid material, where the crystallization medium comprises 80 vol. % to 100 vol. % of at least one amide, 0 vol. % to 10 vol. % of at least one organic acid, and 0 vol. % to 10 vol. % water.

BRIEF DESCRIPTION OF THE DRAWINGS

The invention can be better understood with reference to the following detailed description together with the appended illustrative drawings in which like elements are numbered the same:

FIG. 3 depicts a pictorial representation of a three phase experimental approach used to reduce the present invention to practice.

FIGS. 5A&B depicts micrographs of (A) the trichromatic phosphor sample (B) the $[CH(NH_2)_2][Ln(HCOO)_4]$ crystalline product after reaction for 3 d.

FIGS. 7A&B depict solid state photoluminescence spectra of $[CH(NH_2)_2][Ln(HCOO)_4]$ crystals. (A) $Eu^{3+}$ and (B) $Tb^{3+}$.

FIG. 19 pictorially depicts the methodology for recovering rare earth elements from Nd—Fe—B magnets from hard drives.

DETAILED DESCRIPTION OF THE INVENTION

We have discovered that complex mixtures or oxide mixtures that include rare earth elements react readily with simple organic amides such as formamide and/or alkylated formamides. We have found that this formamide technology is amenable to extracting rare earth elements from complex oxide mixtures including one or more rare earth elements such as mixtures found in cathode ray tube and fluorescent light bulb phosphors. We have also found that this formamide technology is amenable to extract neodymium (Nd) from Nd—Fe—B magnets or other rare earth elements from other materials including rare earth elements. We also believe, based on the successful extraction of rare earth elements from phosphors and magnets, that the formamide technology should be equally amenable to extract rare earth elements from spent FCC catalysts and from three way automotive catalytic converter catalysts.

The invention provides a system for recovering rare earth elements from complex mixture of materials without the using strong acids and related waste disposal problems, where the system includes a temperature and pressure controlled vessel into which is added a complex mixture including rare earth elements to a crystallization media comprising a formamide, water and formic acid under solvothermal conditions to selectively crystallize rare earth metal formates capable of being gravity separated.

The present invention offers the advantages of being a crystallization approach, which is rarely used in REE recycling processes. The approach does not require the use of mineral acids are used as the operable pH range of the present invention is between 6 and 7 reducing the impact on environment including water resources. The approach is readily amenable to recycling, which prevents resource depletion of rare earths. The approach reduces the environmental effects of waste in landfills. With formamide recycle, the process may be low-waste.

Figure 1:
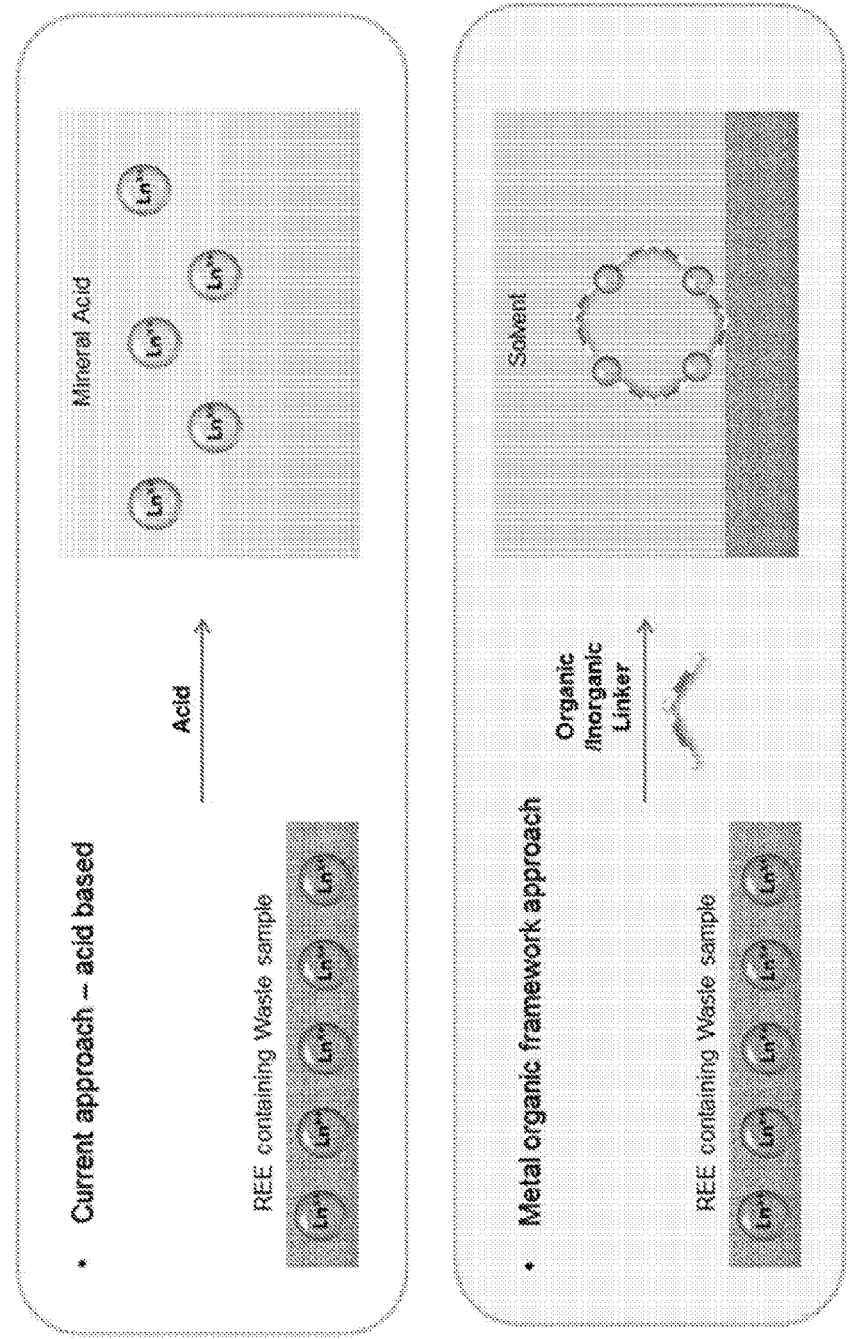
FIG. 1 depicts a graphical comparison of the current rare earth element recovery systems and the present rare earth element recovery system.

Referring now to FIG. 1, a comparison of the present rare earth element (REE) recovery approach with the current approach. In the current approach, a mineral acid is used to dissolve the REE. The resulting solution is then used to extract the REEs. In our approach, the REE containing material is reacted with an organic/inorganic linker from which the REE compounds selectively crystallize.

Previous Literature on Rare Earth Formates

Figure 2C:
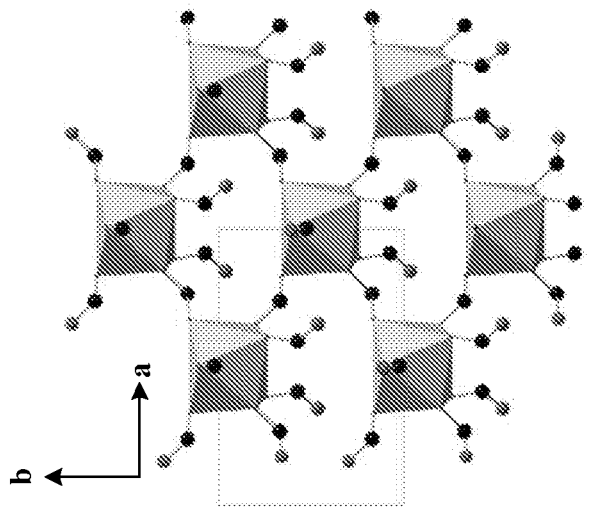
FIGS. 2A-C depict projections of the structures of A) $Ln(HCOO)_3$, B) $[CH(NH_2)_2][Ln(HCOO)_4]$, and C) $[Ln(HCOO)_3(HCONH_2)_2]$; the Ln-O coordination is represented by the polyhedra, and C, N, and O atoms by black, blue and red circles.

Several different rare earth metal formates have been described in the literature. The simple anhydrous compounds having the composition $Ln(HCOO)_3$ (Ln=La, Ce, Pr, Nd, Sm, Tb, Tm, Er, Y) have been known for many years and are well characterized structurally.[6-10] The compounds have a neutral framework structure composed of $Ln^{3+}$ ions coordinated by oxygen atoms from the formate ligands. The lanthanide ion is coordinated by nine oxygen atoms in a tricapped trigonal prismatic geometry. The oxygen atoms of the formate ligand differ; one forms $\mu^2$-bridges between neighboring $Ln^{3+}$ ions, while the second is mono-coordinating. A projection of this structure type is shown in FIG. 2A. The space group is noncentric and a significant amount of work exists on the optical properties, particularly second harmonic generation, using this compound class.[11-14]

A second group of formate compounds have been synthesized by reaction of $Er(NO_3)_3 \cdot 6H_2O$ with monoamines and formic acid in a methanol/N,N-dimethylformamide solutions at ambient temperature.[15] These compounds, of general formula $[AH^+][Er(HCOO)_4^-]$, have negatively charged framework structures that are "templated" by the ammonium or an organic cation. Chiral erbium-formate frameworks with $AH^+$=ammonium $NH_4^+$, methylammonium $CH_3NH_3^+$, formamidinium $NH_2CHNH_2^+$, guanidinium $C(NH_2)_3^+$, imidazolium $C_3H_5N_2^+$, ethylammonium $CH_3CH_2NH_3^+$, and ethanolammonium $HOCH_3CH_2NH_3^+$ have been reported.[15] Other examples of the formamidinium compound were obtained recently for Ln=Eu, Gd, Tb, Dy.[16] Two compounds templated by dications have also been reported $[AH_2][Er(HCOO)_4]_2$ with A=dimethylethylenediamine and tetramethyl-ethylenediamine.[17] The coordination geometries of the rare earth and the framework topologies are determined by the shape and size of the template cations.

Figure 2B:
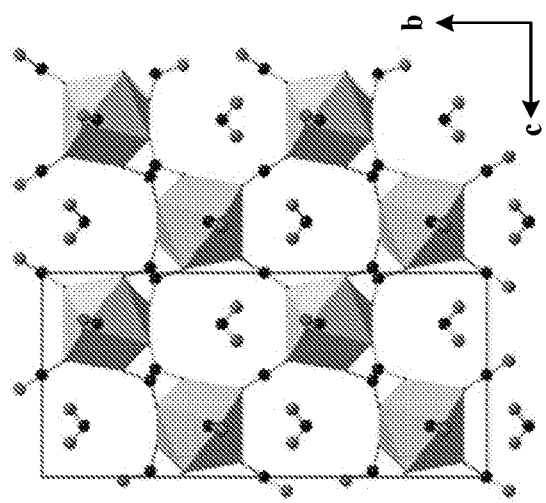
Figure 2A:
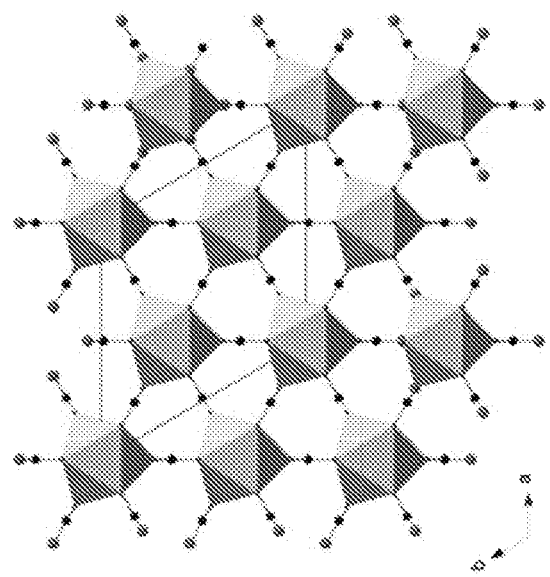

Of particular relevance to the present invention is the structure of the formamidinium compound $[NH_2CHNH_2^+][Ln(HCOO)_4^-]$ which is shown in FIG. 2B. In this structure, the rare earth cation is eight coordinated by oxygen atoms from formate ligands and has a square antiprismatic geometry. Each formate ligand bridges adjacent lanthanide ions and the negative framework charge is balanced by the formamidinium cations, which are located inside channels in the structure. The last relevant rare earth formate framework has the composition $Ln(HCOO)_3 \cdot 2(HCONH_2)$, (Ln=Er, Dy) with each $Ln^{3+}$ ion coordinated by six oxygen atoms from formate ligands and two oxygen atoms from neutral formamide molecules (FIG. 2C).[18] Adjacent polyhedra are bridged by formate anions to form a network that is topologically related to $ReO_3$.

Embodiments of this invention relate to systems for recovering rare earth elements from a material containing rare earth elements including a temperature and pressure controlled vessel into which is added the material and a rare earth element crystallization medium under solvothermal conditions sufficient to selectively crystallize the rare earth elements to form a rare earth metal crystals capable of being separated from other solid materials. The systems also include a separator for separating the rare earth metal crystals from the material to form a purified rare earth metal crystalline composition. The crystallization medium comprises 80 vol. % to 100 vol. % of at least one amide, 0 vol. % to 10 vol. % of at least one organic acid, and 0 vol. % to 10 vol. % water. In certain embodiments, the separator is a gravity separator, while in other embodiments, the separator is a magnetic separator. Of course, it should be recognized that the separator may be any separator that gives rise to a complete or substantially complete separation of the rare earth element crystals from other solid materials. The systems may also include a purifying vessel for purifying the rare earth metal formate crystalline composition. The systems may also include a post-calcining vessel for converting the purified rare earth formate crystalline composition into purified rare earth oxides. The systems may also include a pre-calcining vessel for calcining the material prior to adding the material to the temperature and pressure controlled vessel. The amides are selected from the group consisting of formamide, N-carbylformamides, N,N-dicarbylformamides, or mixtures or combinations thereof, where the carbyl group are the same or different and are selected from the group consisting of linear or branched alkyl groups having between 1 and 6 carbon atoms, aryl groups, araalkyl groups, alkaaryl group, or mixture thereof and wherein the organic acids are selected from the group consisting of formic acid, acetic acid, propanoic acid and mixtures or combinations thereof.

Embodiments of this invention relate to methods for recovering rare earth elements from a material including containing rare earth elements including adding the material and a rare earth element crystallization medium into a temperature and pressure controlled vessel under solvothermal conditions sufficient to selectively crystallize the rare earth elements to form a rare earth metal crystals capable of being gravity separated, where the crystallization medium comprises 80 vol. % to 100 vol. % of at least one amide, 0 vol. % to 10 vol. % of at least one organic acid, and 0 vol. % to 10 vol. % water. The methods may also include gravity separating the rare earth metal crystals to form a rare earth crystalline solid composition. The methods may also include magnetically separating the rare earth metal crystals to form a rare earth crystalline solid composition. The methods may also include purifying the purified rare earth metal formate crystalline composition. The methods may also include post-calcining the purified rare earth crystalline composition into purified rare earth oxides. The methods may also include pre-calcining the material prior to adding the material to the temperature and pressure controlled vessel. The amides are selected from the group consisting of formamide, N-carbylformamides, N,N-dicarbylformamides, or mixtures or combinations thereof, where the carbyl group are the same or different and are selected from the group consisting of linear or branched alkyl groups having between 1 and 6 carbon atoms, aryl groups, araalkyl groups, alkaaryl group, or mixture thereof and wherein the organic acids are selected from the group consisting of formic acid, acetic acid, propanoic acid and mixtures or combinations thereof.

Embodiments of this invention relate to methods for recovering rare earth elements from a material including containing rare earth elements including mixing the material with a rare earth element crystallization medium in a temperature and pressure controlled vessel under solvothermal conditions sufficient to selectively crystallize the rare earth elements to form a rare earth metal crystals capable of being gravity separated, and separating the rare earth metal crystals to form a rare earth crystalline solid composition, where the crystallization medium comprises 80 vol. % to 100 vol. % of at least one amide, 0 vol. % to 10 vol. % of at least one organic acid, and 0 vol. % to 10 vol. % water. The methods may also include purifying the purified rare earth metal formate crystalline composition. The methods may also include post-calcining the purified rare earth crystalline composition into purified rare earth oxides. The methods may also include pre-calcining the material prior to adding the material to the temperature and pressure controlled vessel. The amides are selected from the group consisting of formamide, N-carbylformamides, N,N-dicarbylformamides, or mixtures or combinations thereof, where the carbyl group are the same or different and are selected from the group consisting of linear or branched alkyl groups having between 1 and 6 carbon atoms, aryl groups, araalkyl groups, alkaaryl group, or mixture thereof and wherein the organic acids are selected from the group consisting of formic acid, acetic acid, propanoic acid and mixtures or combinations thereof.

Embodiments of this invention relate to compositions for recovering rare earth elements from a material including containing rare earth elements including the material, a rare earth element crystallization medium, and rare earth metal crystals, where the crystallization medium comprises 80 vol. % to 100 vol. % of at least one amide, 0 vol. % to 10 vol. % of at least one organic acid, and 0 vol. % to 10 vol. % water. The amides are selected from the group consisting of formamide, N-carbylformamides, N,N-dicarylformamides, or mixtures or combinations thereof, where the carbyl group are the same or different and are selected from the group consisting of linear or branched alkyl groups having between 1 and 6 carbon atoms, aryl groups, araalkyl groups, alkaaryl group, or mixture thereof and wherein the organic acids are selected from the group consisting of formic acid, acetic acid, propanoic acid and mixtures or combinations thereof.

Embodiments of this invention relate to processes for recovering rare earth elements from CRT phosphors including obtaining CRT monitors, removing phosphor material from CRT lenses to form a powered phosphor material, and calcining the powered phosphor material to form a calcined phosphor material, which are pre-treatment steps for the removal process. The processes also include reacting the calcined phosphor material with a rare earth element crystallization medium, solid/liquid separating in a solid/liquid separator to form a solid material, separating the solid material in a solid/solid density separator using a density separation medium, and separating the solid material into a residual solid material and a rare earth element containing solid material, where the crystallization medium comprises 80 vol. % to 100 vol. % of at least one amide, 0 vol. % to 10 vol. % of at least one organic acid, and 0 vol. % to 10 vol. % water. The processes may also include separating the density separation medium into its constituents for reuse.

Embodiments of this invention relate to processes for recovering rare earth elements from a mercury free waste phosphor material including obtaining a mercury free waste phosphor material, separating the mercury free waste phosphor material in a solid/solid density separator using a density separation medium into a rare earth element rich, mercury free waste phosphor material, and calcining the rare earth element rich, mercury free waste phosphor material to form a calcined rare earth element rich, mercury free waste phosphor material, which are pre-treatment steps to prepare the material for subsequent rare earth element removal. The processes also include reacting the calcined rare earth element rich, mercury free waste phosphor material with a rare earth element crystallization medium to form rare earth element crystals, solid/liquid separating in a solid/liquid separator to form a solid material, and separating the solid material in a solid/solid density separator using a density separation medium to form a rare earth element containing solid material, where the crystallization medium comprises 80 vol. % to 100 vol. % of at least one amide, 0 vol. % to 10 vol. % of at least one organic acid, and 0 vol. % to 10 vol. % water. The processes also may include separating the density separation medium into its constituents for reuse.

Embodiments of this invention relate to processes for recovering rare earth elements from magnets including obtaining magnets for hard disk drives and comminuting the magnets to form a comminuted magnetic material, which are pre-treating steps to prepare the material for rare earth element removal or extraction. The processes also include reacting the comminuted magnetic material with a rare earth element crystallization medium to form rare earth element crystals, solid/liquid separating in a solid/liquid separator to form a solid material, separating the solid material in a solid/solid magnetic separator using a magnetic field to form a rare earth element containing solid material, where the crystallization medium comprises 80 vol. % to 100 vol. % of at least one amide, 0 vol. % to 10 vol. % of at least one organic acid, and 0 vol. % to 10 vol. % water.

Embodiments of this invention relate to processes for recovering rare earth elements from NiMH batteries including obtaining NiMH batteries and comminuting the NiMH batteries to form a comminuted NiMH battery material, which are pre-treating steps to prepare the material for rare earth element removal or extraction. The processes also include reacting the comminuted magnetic material with a rare earth element crystallization medium to form rare earth element crystals, solid/liquid separating in a solid/liquid separator to form a solid material, separating the solid material in a solid/solid magnetic separator using a magnetic field to form a rare earth element containing solid material, where the crystallization medium comprises 80 vol. % to 100 vol. % of at least one amide, 0 vol. % to 10 vol. % of at least one organic acid, and 0 vol. % to 10 vol. % water.

Suitable Reagents for Use in the Invention

Suitable formamides for use in the present invention include, without limitation, formamide ($HCONH_2$), substituted formamides having the general formula H—C(O)—$NR^1H$ and H—C(O)—$NR^1R^2$, where $R^1$ and $R^2$ are the same or different carbyl groups having between 1 and 20 carbon atoms. Exemplary carbyl groups include linear or branched alkyl groups, substituted or unsubstituted cyclic carbyl groups, aryl groups, alkaaryl groups, araalkyl groups, or mixtures and combinations thereof. Exemplary examples include, without limitation, methylformamide (H—C(O)—NMeH), ethylformamide (H—C(O)—NEtH), dimethylformamide (H—C(O)—$NMe_2$), methylethylformamide (H—C(O)—NMeEt), or mixtures and combinations thereof. It should be recognized that the selection of the appropriate formamide compound for efficient and effective extraction of rare earth elements from complex oxide mixtures or metals mixtures.

EXPERIMENTS OF THE INVENTION

Referring now to FIG. 3, a diagram of the experiments set forth in the application is shown. The experimental verification including three phases. Phase 1 included experiments with $Ln_2O_3$ to demonstrate the efficacy of our approach. Phase 2 included experiments with pure tri-chromatic phosphors. And Phase 3 included experiments with materials derived from real world materials.

Extending Formamide Reactions

In order to establish our own synthesis systems and methods and to extend the known reactions to include all rare earth elements, we have carried out experiments on the reactions of hydrated lanthanide nitrates directly with formamide. All the reactions were performed solvothermally at temperatures from 50° C. to 120° C. and with reaction times from 3 to 5 days. Hydrated lanthanide nitrates (Y, La, Ce, Pr, Nd, Sm, Eu, Gd, Tb, Ho, Tm, Yb, Lu) were used as the source of metal cations, water, and formamide (≥99%, GC grade) purchased from Sigma-Aldrich were used as the reactant and solvent. In a typical reaction, 0.5 mmol of lanthanide nitrate was transferred to a 22 mL glass vial and mixed with 5 mL of formamide. All the nitrates completely dissolved in the formamide and clear solutions were obtained. Vials were sealed and transferred to ovens, and heated to various temperatures. Reactions were monitored periodically to follow visually the changes in reaction mixtures. The term solvothermal synthesis means a method of producing chemical compounds in a sealed vessel in an oven or other heated container, where the solution is generally non aqueous. The solvothermal route has the benefits over both the sol-gel and the hydrothermal methods. Thus, solvothermal synthesis allows for the precise control over the size, shape distribution, and crystallinity of metal oxide nanoparticles or nanostructures. These characteristics may be altered by changing certain experimental parameters, including reaction temperature, reaction time, solvent type, surfactant type, and precursor type.

Depending on the reaction temperature, time and size of the rare earth cation, three different product phases were obtained from the reactions. At all the reaction conditions used (50° C., 70° C., 100° C., 120° C. and for 3 days (3 d) or 5 days (5 d)), the larger rare earth cations (Ln=La, Ce, Pr, and Nd) formed Ln(HCOO)$_3$ as the final product. No traces of any other compounds were observed. Comparison of powder X-ray diffraction patterns with patterns simulated from literature single crystal data were used to confirm phase purity.

Figure 4:
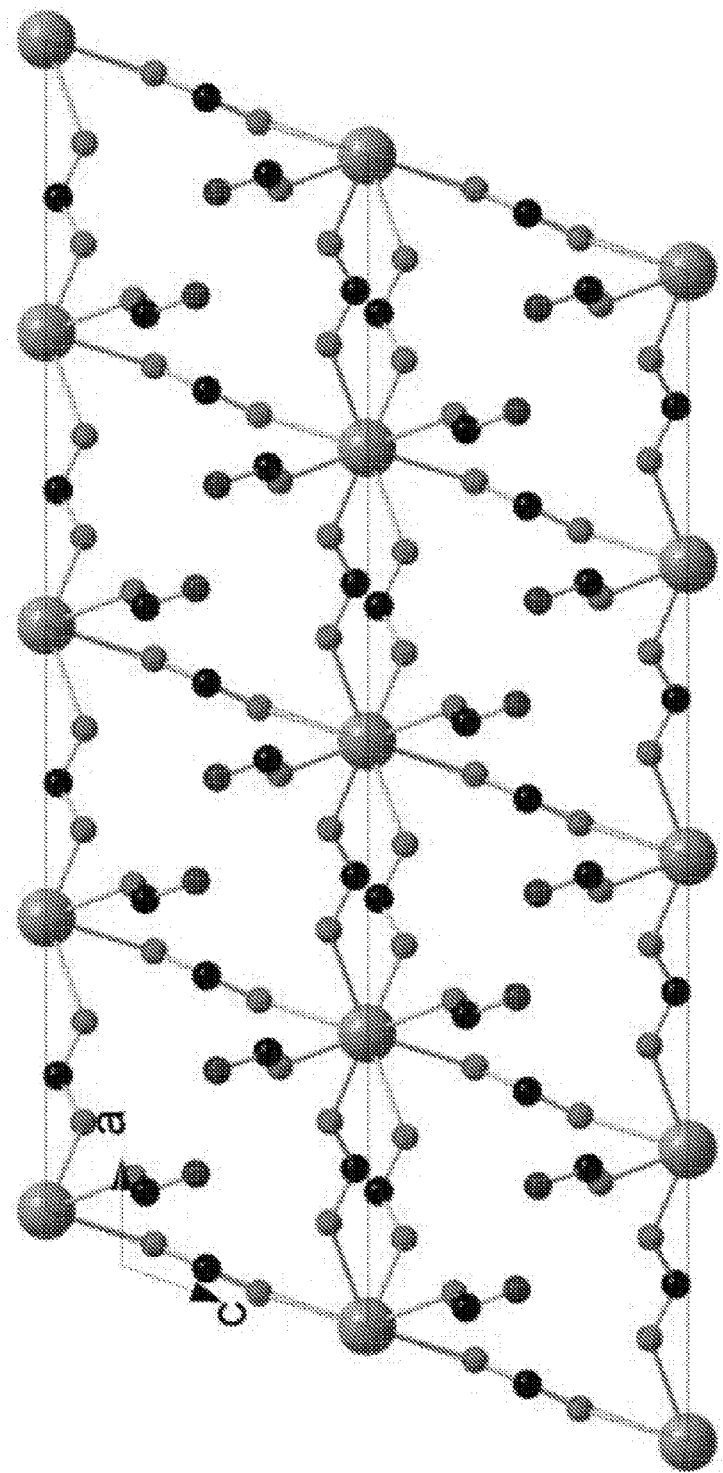
FIG. 4 depicts the structure of $[Ln(HCOO)_3(HCONH_2)_2]$ showing the arrangement of coordinated formamide molecules; Ln, O, C, and N atoms are represented by green, red, black, and blue circles.

In contrast, medium and small sized rare earth cations did not yield Ln(HCOO)$_3$ as the final product, but formed two different phases depending on the reaction conditions. At relatively low temperatures and with shorter reaction times, the formation of perovskite like Ln-formato-formamide phases [Ln(HCOO)$_3$(HCONH$_2$)$_2$] was favored as shown in FIG. 4. These compounds crystallize in monoclinic space group C2 and are obtained in the reactions of midsize rare earth element nitrates (Ln=Y, Sm, Eu, Gd, Tb, and Ho) with formamide at a temperature of 70° C. and a reaction time of 3 d. The smaller rare earth element nitrates (Ln=Tm, Yb and Lu) form this phase at a reaction temperature of 50° C. and a reaction time of 5 d. Legendziewicz et al.[12] reported the remaining two Ln formato-formamide (Ln=Dy, Er) compounds. These compounds are moisture sensitive and lose their crystallinity after several days at room temperature even in their mother liquor.

The relatively more stable crystalline phase, formamidinium templated Ln formate [CH(NH$_2$)$_2$][Ln(HCOO)$_4$], is the favored reaction product for all medium and small rare earth element cations at relatively high temperatures and at longer reaction times. These compounds crystallized when medium size rare earth element nitrates (Ln=Y, Sm, Eu, Gd, Tb, and Ho) were reacted with formamide for 3 d at 100° C. Further, we noted that reaction at 70° C. for more than 7 d resulted in a transformation of [Ln(HCOO)$_3$(HCONH$_2$)$_2$] crystals to [CH(NH$_2$)$_2$][Ln(HCOO)$_4$] crystals. Reactions of nitrates of small rare earth elements (Ln=Tm, Yb and Lu) form this phase on reaction at 70° C. for 3 d. Out of these nine compounds, four compounds (Ln=Eu, Gd, Tb and Dy) were reported by Rossin et al. (2012).[16] The Er compound was reported by Liu et al. (2011).[15] The [CH(NH$_2$)$_2$][Ln(HCOO)$_4$] compounds are isostructural and crystallize in the orthorhombic space group C222$_1$.

The mechanism for the generation of formamidine cation from formamide is not yet understood. The arrangement of the coordinated formamide molecules in the unit cell as shown in FIG. 4 may provide a favorable pathway.

Reactions of Lanthanide Oxides Directly with Formamide

As the next step in the experimental investigation, rare earth oxides were used as the source of the rare earth metal cations. Repeating the experiments described using the nitrates gave the same final results. The reaction time, however, had to be increased to 12 d to get significant crystallization. Consequently, further experiments were carried out to enhance the reaction kinetics. Addition of appropriate amounts of water to the reaction mixture increased the reaction rate considerably and the reaction time was reduced from 12 d or more to 3 d to 5 d. The amount of water added to the reaction mixture was optimized to prevent dissolution of the products some of which readily dissolve in excess water. Except for La, Pr, Nd, and Sm which form Ln(HCOO)$_3$, Ce (from CeO$_2$) and Tb (from Tb$_4$O$_7$), all the other rare earth elements (Ln=Y, Gd to Lu) were isolated as pure [Ln(HCOO)$_3$(HCONH$_2$)$_2$] or [CH(NH$_2$)$_2$][Ln(HCOO)$_4$] or as mixed phases. Some preliminary reactions were carried out using mixtures of rare earth oxides phases. Combinations of two different oxides were used as a model systems of mixed oxide starting material and under optimized reaction conditions they were isolated as crystals of [Ln(HCOO)$_3$(HCONH$_2$)$_2$] or [CH(NH$_2$)$_2$][Ln(HCOO)$_4$] or powder phases of Ln(HCOO)$_3$.

Reaction of a Premixed Phosphor with Formamide

Figure 6B:
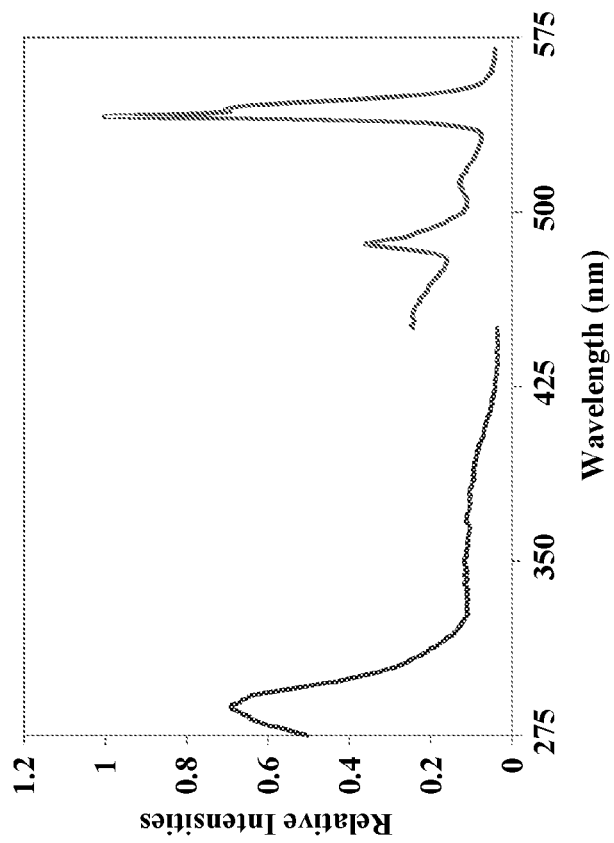
FIGS. 6A&B depict solid-state photoluminescence spectra of trichromatic phosphor (A) $Eu^{3+}$ and (B) $Tb^{3+}$.
Figure 6A:
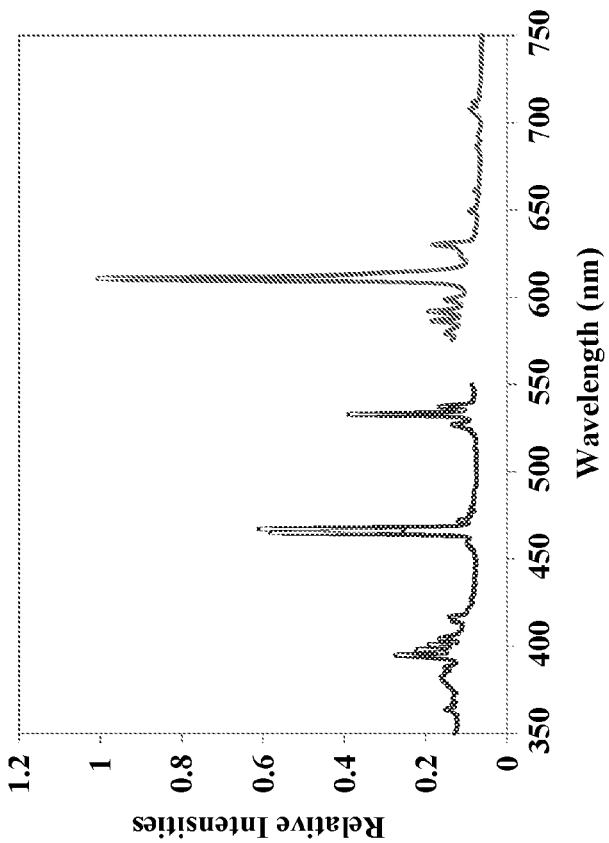

The success of the initial experiments on the reactions of rare earth metal nitrates and oxides and formamide prompted us to further examine the possibility of extracting rare earth metals from more complex materials or systems. As a model material or system, we chose a pre-mixed trichromatic phosphor mixture available from Sigma-Aldrich as the starting rare earth metal mixture. This material is a mixture of three compounds doped with rare earth metals to form three colored phosphors: Y$_2$O$_3$:Eu (red), CeMgAl$_{11}$O$_{19}$:Tb (green), and BaMgAl$_{10}$O$_{17}$:Eu (blue). The mixture is a white powder and was used in the experiments as received. The starting phosphor mixture was imaged with a scanning electron microscope (JEOL, JSM6330F, acceleration voltage 15 kV). The particle sizes of the starting material were determined to be in the range 4 µm to 10 µm (FIG. 5A). The photoluminescence spectrum of phosphor material was recorded in the solid state at room temperature using a PTI QuantaMaster QM4 CW spectrofluorometer. The spectrum corresponding to Eu$^{3+}$ emission (FIG. 6A) was obtained by exciting the sample at 393 nm and the spectrum corresponding to Tb$^{3+}$ emission (FIG. 6B) was obtained by exciting the sample at 290 nm. Both spectra show good agreement with the previously reported emission spectra of the phosphor material.[19]

All the experiments were performed solvothermally at 100° C. The reactions were carried out for maximum of 3 d. The time was varied from 3 hours (3 h) to 3 d to monitor the changes in kinetics. The reaction conditions used for these initial experiments were the same as the conditions used for the reactions of rare earth metal oxides with formamide. In a typical experiment, 0.25 g of pre-mixed phosphor was transferred to a 22 mL glass vial and mixed with 10 mL of formamide and 0.25 mL of water. No obvious dissolution of phosphor was observed at the beginning. The reaction vials were sealed, transferred to ovens, and heated to temperature. Reactions were monitored continuously to follow the changes in reaction mixtures.

The first noticeable change in the reaction mixture was observed after heating for ~2 h. Some colorless small crystals started to appear on the surface of the undissolved phosphor. After 3 h the crystals became much larger and the yield was enough to cover the bottom of the vial. At this point one of the vials was taken out from the oven and filtered while it was hot. The colorless clear effluent was transferred to a 22 mL glass vial and put back in to the 100° C. oven. The filtered solid was dried in a vacuum oven and then checked under the microscope. Two different phases were identified: one phase consisted of large colorless crystals with the average crystal size of 1 mm to 2 mm and the other phase consisted of a white powder (FIG. 5B). Single crystal diffraction data were collected for some selected single crystals and confirmed that the phase was perovskite like Ln-formato-formamide [Ln(HCOO)$_3$(HCONH$_2$)$_2$]. The crystal yield was about 60% of the starting material weight. Powder diffraction data of the powder phase indicated that it consisted of unreacted starting material and some other unidentified phases.

Another vial was taken out from the oven after reaction for 4 h. Two different phases were observed; one crystalline and one powder. The crystal morphology however was different from the phase obtained after 2 h. The average crystal size was about 3 mm to 4 mm. Single crystal diffraction data were collected for some selected single crystals and confirmed that the phase was the formamidinium templated formate framework [CH(NH$_2$)$_2$][Ln(HCOO)$_4$], confirming the transformation of [Ln(HCOO)$_3$(HCONH$_2$)$_2$] to [CH(NH$_2$)$_2$][Ln(HCOO)$_4$]. The yield of the crystals was ~70% of the starting material weight.

Several experiments were carried out at different reaction times. All experiments resulted in a final major product of [CH(NH$_2$)$_2$][Ln(HCOO)$_4$] crystals and a minor powder phase. The crystal yields form these experiments were not changed significantly with the time, and were approximately ~70% to 80% of the starting material weight. Photoluminescence spectra were used to identify the rare earth element present in the formate crystals. Photoluminescence spectra were recorded for Eu$^{3+}$ emission (FIG. 7A) and Tb$^{3+}$ emission (FIG. 7B) using corresponding excitations at 393 nm and 270 nm, respectively. The presence of Eu$^{3+}$ in the crystal phase was confirmed from the four emission bands at 592, 618, 649 and 699 nm. Two characteristic emission bands of Tb$^{3+}$ were observed at 487 and 542 nm. These observations are in a good agreement with the previously reported emission spectra of Eu$^{3+}$ and Tb$^{3+}$.[20-21] Energy Dispersive X-ray analysis (EDX) confirmed the presence of yttrium in the [CH(NH$_2$)$_2$][Ln(HCOO)$_4$] crystals.

Recovery of Rare Earth Elements from Cathode Ray Tube Phosphors Using Formamide

Figure 8B:
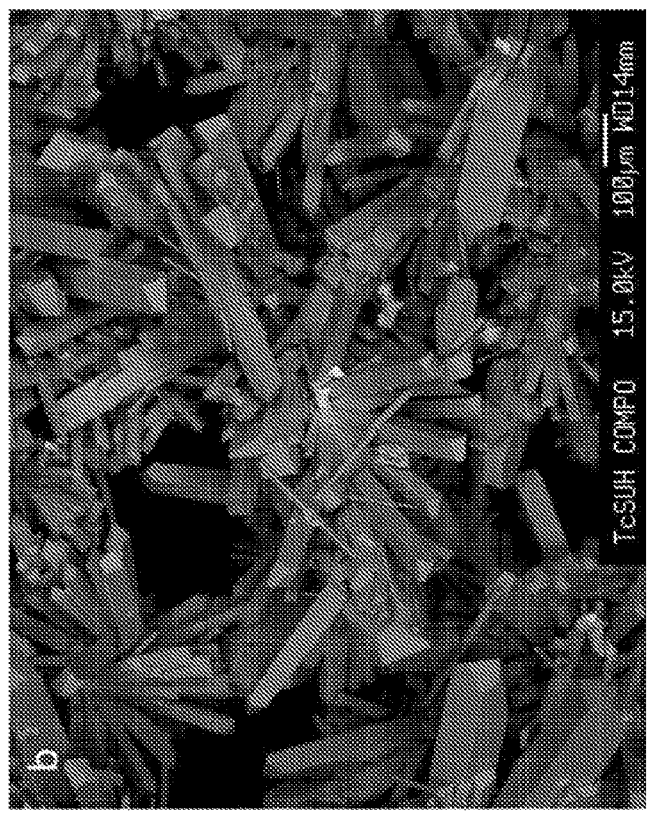
FIGS. 8A&B depict micrographs of (A) the CRT phosphor sample and (B) the $[CH(NH_2)_2][Ln(HCOO)_4]$ crystalline product.
Figure 8A:
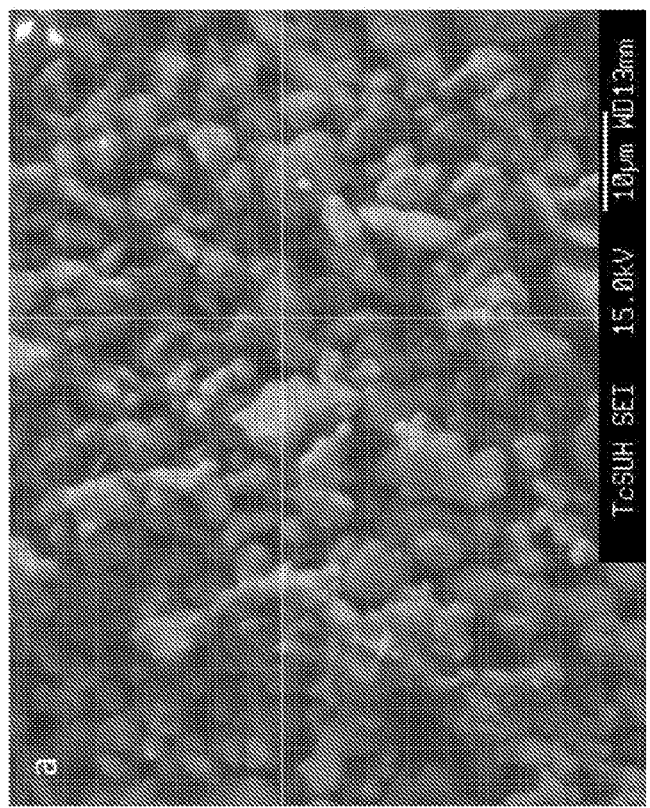
Figures 9A, 9B:
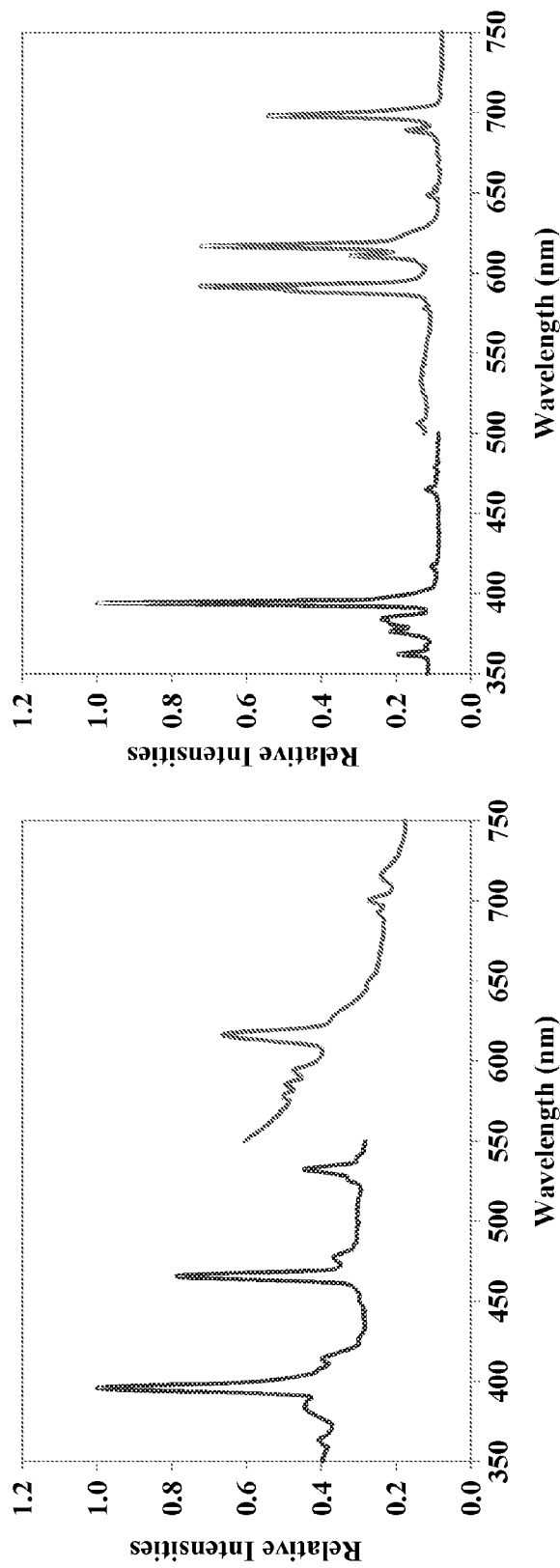
FIGS. 9A&B depict solid state photoluminescence spectra of $Eu^{3+}$ in (A) CRT phosphor sample and (B) $[CH(NH_2)_2][Ln(HCOO)_4]$ crystals after the reaction.

The success of the preliminary studies and the tri-chromatic phosphor model system prompted us to extend these studies to "real" phosphor applications. Thus, we investigated the method to determine the feasibility of recovering rare earth elements from industrial waste. In the first step, we recovered rare earth elements from waste phosphors used in color computer displays. Samples of waste phosphor were obtained by scraping the lenses of cathode ray tubes (CRTs) of discarded computer monitors. About 1 g to 1.5 g of phosphor material may be collected from 15" and 17" displays. The phosphor samples were imaged using the scanning electron microscope (FIG. 8A). The samples were hetero-dispersed with particle sizes ranging from 2 µm to 15 µm. The samples were further characterized by the powder X-ray diffraction data. The diffraction patterns confirmed the presence of ZnS and Y$_2$O$_2$S as the main crystalline components in the samples. Elemental analyses of the starting material were performed by Galbraith laboratories (Knoxville, Tenn.) and confirmed the presence of yttrium (23.5%) as the main element and europium (1.52%) as the next most abundant rare earth element in the samples. The photoluminescence spectrum of phosphor was recorded in the solid state at room temperature. The spectrum corresponding to Eu$^{3+}$ emission was obtained by exciting the sample at 393 nm (FIG. 9A).

In the first experiments, the phosphor powder was reacted with formamide without any pretreatment. 1 g of phosphor was transferred to 22 mL vials and mixed with 10 mL of formamide and transferred to 100° C. and 120° C. ovens. Vials were monitored closely. These initial experiments did not result in any observable change in the reaction mixture. After 7 d, vials were cooled down to room temperature. The resulting solid was filtered out and dried in a vacuum oven. Powder X-ray diffraction of this solid confirmed only the presence of unreacted starting crystalline constituents. Further experiments were carried out with the addition of 0.25 mL of water under similar reaction conditions. No obvious change in the reactants was observed. Consequently, we introduced 0.25 mL of formic acid into the reactions. After 5 d, crystal formation was observed in the vial at 120° C. The solids from this reaction were filtered and vacuum dried. Two distinct solid phases were produced and a crystalline and a powdered phase were separated. The powder phase was confirmed to consist of unreacted starting material. The crystals were colorless and tiny rod like in shape. The yield of this crystalline phase was ~20% based on the starting material weight. The crystals were characterized by the X-ray methods. Single crystal diffraction data and powder X-ray diffraction data of the manually separated crystals confirmed the phase to be [CH(NH$_2$)$_2$][Ln(HCOO)$_4$] and confirmed the viability of separating rare earth components from the "real" waste phosphor samples using this experimental method.

Further improvements were needed to enhance the product yield and to increase the rate of the reaction. Phosphor samples were calcined before reaction with formamide in order to isolate the rare earth constituents in the form of oxides without any of the organic binders presence in the phosphor coating. The starting phosphor samples were transferred to alumina crucibles and calcined at 800° C. for 5 h. The resulting powder was characterized by X-ray powder diffraction. The diffraction data confirmed the presence of ZnO and Y$_2$O$_2$(SO$_4$) as the major crystalline constituents in the sample. 0.25 g of this sample were then transferred to a 22 mL vial and mixed with 10 mL of formamide and 0.25 mL of water. The starting solid did not dissolve in formamide. The reaction vials were transferred to 100° C. and 120° C. ovens and monitored. No immediate change was observed, however some crystals started to appear in reaction vials after 2 d; crystals then grew rapidly. Vials were cooled to room temperature after 3 d and the resulting solid was filtered and dried in a vacuum oven. The solid mixture consisted of two distinct phases. The crystal phase consisted of large colorless crystals of 0.25 mm to 1 mm size (FIG. 8B). Several crystals were manually separated and examined by single crystal X-ray diffraction. The crystals were identified as the formamidinium templated rare earth formate framework [CH(NH$_2$)$_2$][Ln(HCOO)$_4$]. The crystal yield of this phase was ~70% of the starting material weight; a remarkable improvement in the crystallization. Further characterization of the crystals was done by the chemical analysis, photoluminescence spectroscopy and EDX analysis. Chemical analysis confirmed the presence of yttrium (26.3%) as the major rare earth element in the crystals and europium (2.05%) as the second abundant rare earth element. The values agreed with the composition of the starting CRT phosphor powder (Y; 23.5%, Eu; 1.52%). The elements presence in the crystals were further analyzed and confirmed by EDX analysis and photoluminescence spectroscopy (FIG. 9B).

A majority of the other phase consisted of a white color microcrystalline powder. The SEM micrographs revealed this microcrystalline phase consist of rod like crystals with the same morphology of the large crystals. Powder diffraction of this phase confirmed that the majority was [CH(NH$_2$)$_2$][Ln(HCOO)$_4$] together with some unidentified minor phases.

Further experiments were carried out to optimize the reaction conditions. Addition of an small amount of formic acid was found to have a significant impact on the reaction kinetics. Addition of 0.25 mL of formic acid to 10 mL of formamide and 0.25 mL of water brought down the reaction time to 1.5 d to 2 d. A significant increase in the crystal yield was not observed, however, with this modification. Further experiments were carried out by changing the volume ratios of formamide:water:formic acid at different temperatures. It was found that, increasing the amount of water in the reaction mixture adversely affected the crystal yield. As the amount of water was increased, $[CH(NH_2)_2][Ln(HCOO)_4]$ crystal formation decreased and at a ratio of 10 mL of formamide:1 mL of water, $(NH_4^+)(HCOO^-)$ started to crystallize from the reaction mixture. Increasing the volume of formic acid does not show any significant influence on the crystallization. The presence of a small amount of formic acid in the reaction mixture, however, catalyzes the overall reaction. Temperatures of 100° C. to 110° C. were found to be optimum reaction temperatures. Higher temperatures lead to decomposition of formamide.

After the conversion of rare earth constituents of the CRT phosphor samples to $[CH(NH_2)_2][Ln(HCOO)_4]$, a method was established to separate crystalline material from the final solid. For the initial studies, we used a gravity-based process to separate the final products. A di-iodomethane/acetone mixture was used as the organic dense-medium to separate the $[CH(NH_2)_2][Ln(HCOO)_4]$ crystals. The solid mixture from the reaction was transferred to a separation funnel filled with di-iodomethane. The crystals started to float along with the residual solids. Then the density of the organic-medium was lowered by slowly adding acetone to the funnel until the residual solids sink in the medium. The floating crystals fraction then were filtered and dried in a vacuum oven. The phase purity was confirmed by the powder diffraction data. The fraction of the solids that sank was remixed with di-iodomethane/acetone mixture for further separation of any $[CH(NH_2)_2][Ln(HCOO)_4]$ crystals. The process was repeated until all the crystals were separated and finally the bottom fraction was discarded. Di-iodomethane and acetone were separated by rotary evaporation for reuse.

Figure 10:
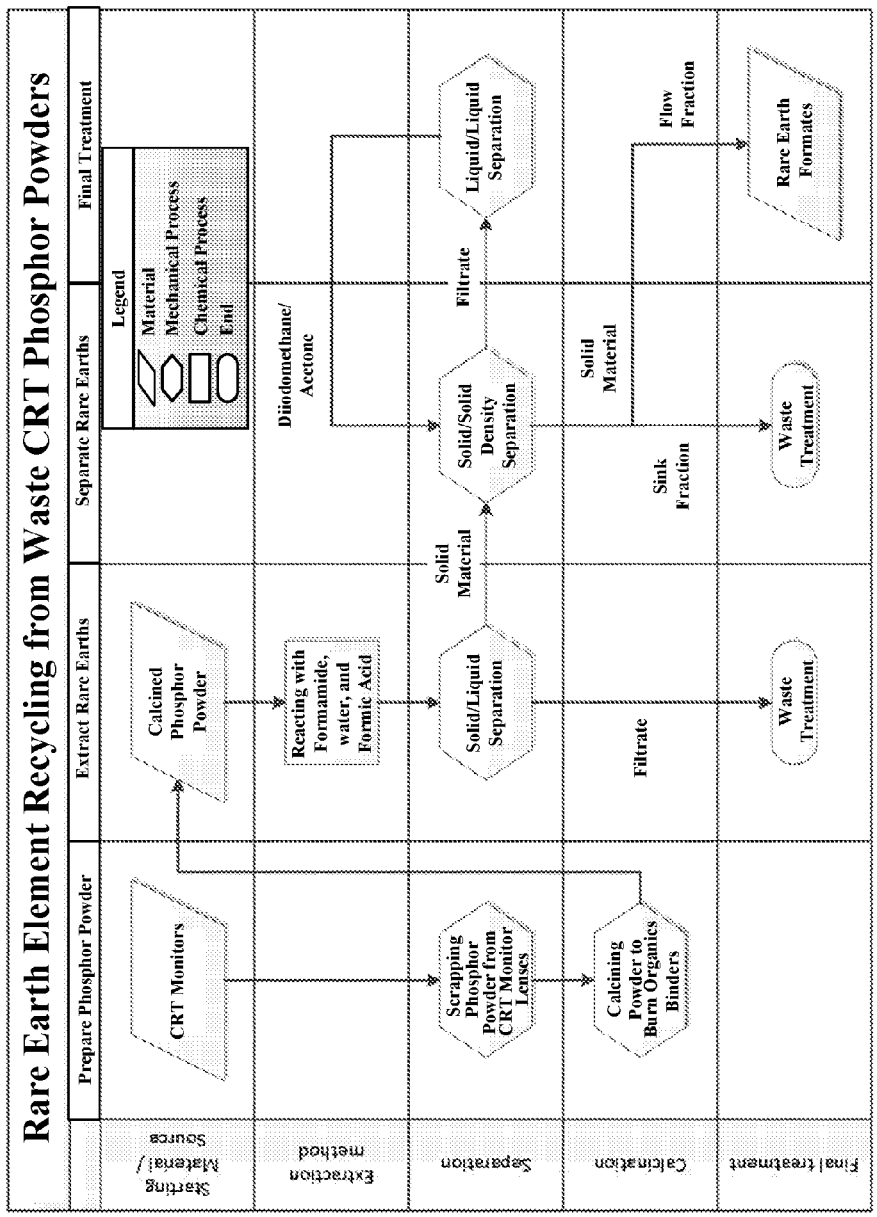
FIG. 10 depicts flow diagram illustrating the process of recovering rare earth constituent from CRT phosphors.
Figure 11:
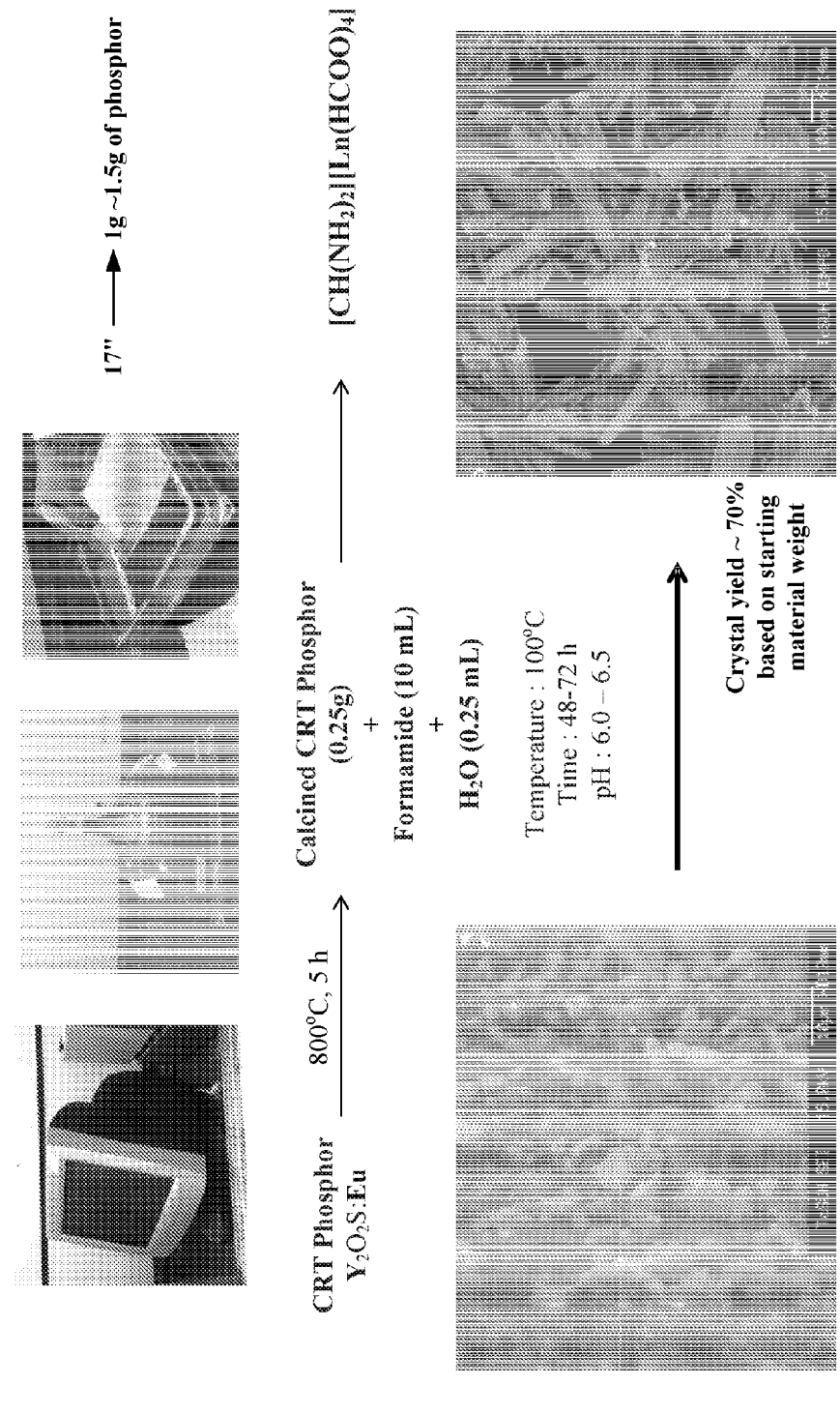
FIG. 11 pictorially depicts the flow diagram of FIG. 10.

The processes or methods are shown in a flow diagram in FIG. 10 and pictorially in FIG. 11. The method includes obtaining CRT monitors, removing phosphor material from the CRT lenses to form a powdered phosphor material. The methods also include calcining the powered phosphor material to form a calcined phosphor material. The methods also include reacting the calcined phosphor material with an extraction system including a formamide, water and formic acid. The methods also include solid/liquid separation to form a solid material. The methods also include separation of the solid material in a solid/solid density separation subsystem using a density separation medium. The methods also include separation of the solid material in to a residual solid material and a rare earth element containing solid material. The methods may also include separating the density separation medium into its constituents for reuse.

Figure 12B:
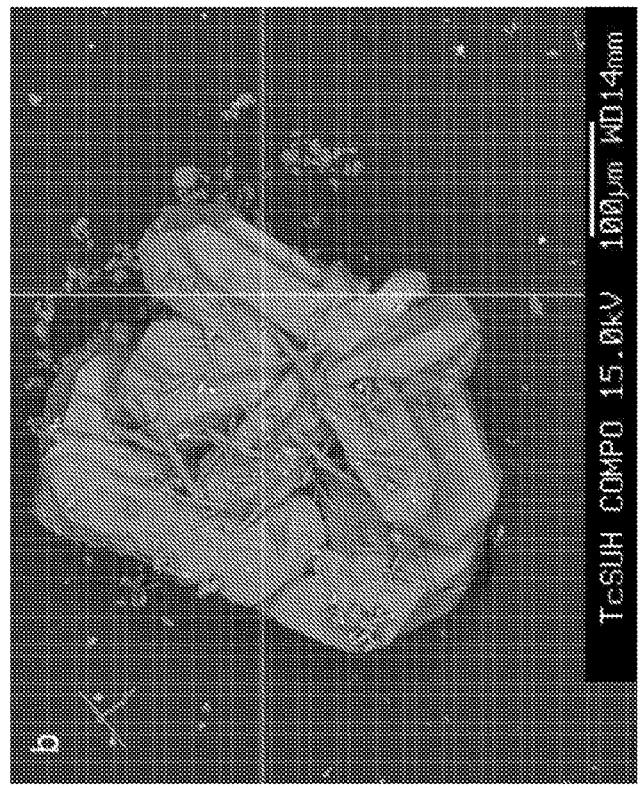
FIGS. 12A&B depict micrographs of (A) the fluorescent lamp phosphor sample (B) the $[CH(NH_2)_2][Ln(HCOO)_4]$ crystalline product.
Figure 12A:
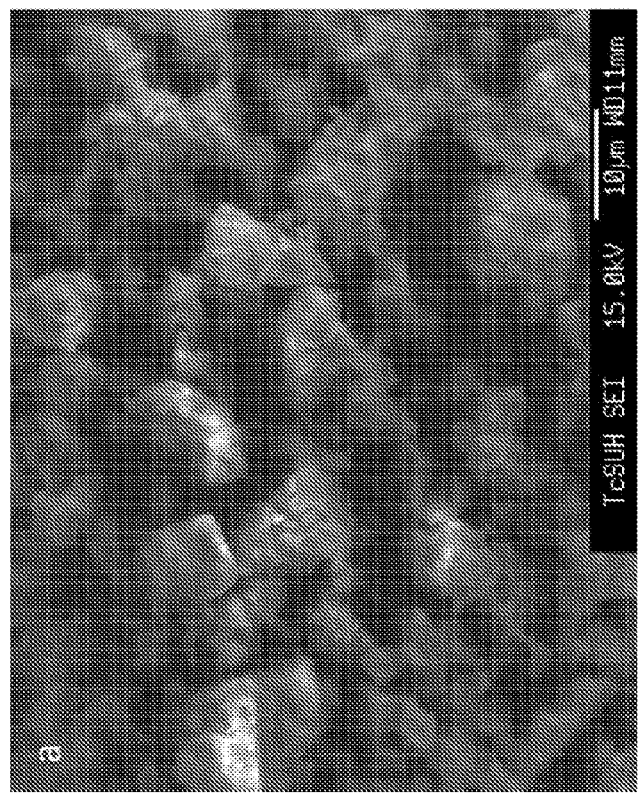

Recovery of Rare Earth Elements from Waste Fluorescent Lamp Phosphors Using Formamide As the next step of this study, the feasibility of extracting rare earth elements from waste fluorescent lamp phosphors was investigated. The material used in these experiments was actual sample of mercury free waste phosphor material supplied by AERC, Inc. PA. Samples were received after the mercury and glass removal process. As per the MSDS issued by the supplier, the sample contained calcium phosphate (40 wt. % to 60 wt. %), glass (40 wt. % to 60 wt. %) and phosphor powder. The only rare earth element reported in the data sheet is yttrium with a percentage weight of 0% to 4%. The sample was imaged with the SEM to determine the particle distribution (FIG. 12A). The particle sizes ranged from 1 μm to 15 μm.

The first phase of experiments was carried out without any pre-treatment. 1 g of phosphor as received was reacted with 10 mL of formamide and 0.25 mL of water at 100° C. or 120° C. After 5 d of reaction at 100° C. crystals started to appear. After 7 d, the vials were cooled down to room temperature, filtered and the solid dried in a vacuum oven. Colorless 0.1 mm to 0.5 mm size crystals (FIG. 12B) and very tiny rod like crystals were separated from the 100° C. reaction mixture with a crystal yield of 25%. Single crystal X-ray diffraction data of the crystals confirmed that the crystals belongs to formamidinium templated rare earth formate framework $[CH(NH_2)_2][Ln(HCOO)_4]$ family.

Figures 13A, 13B:
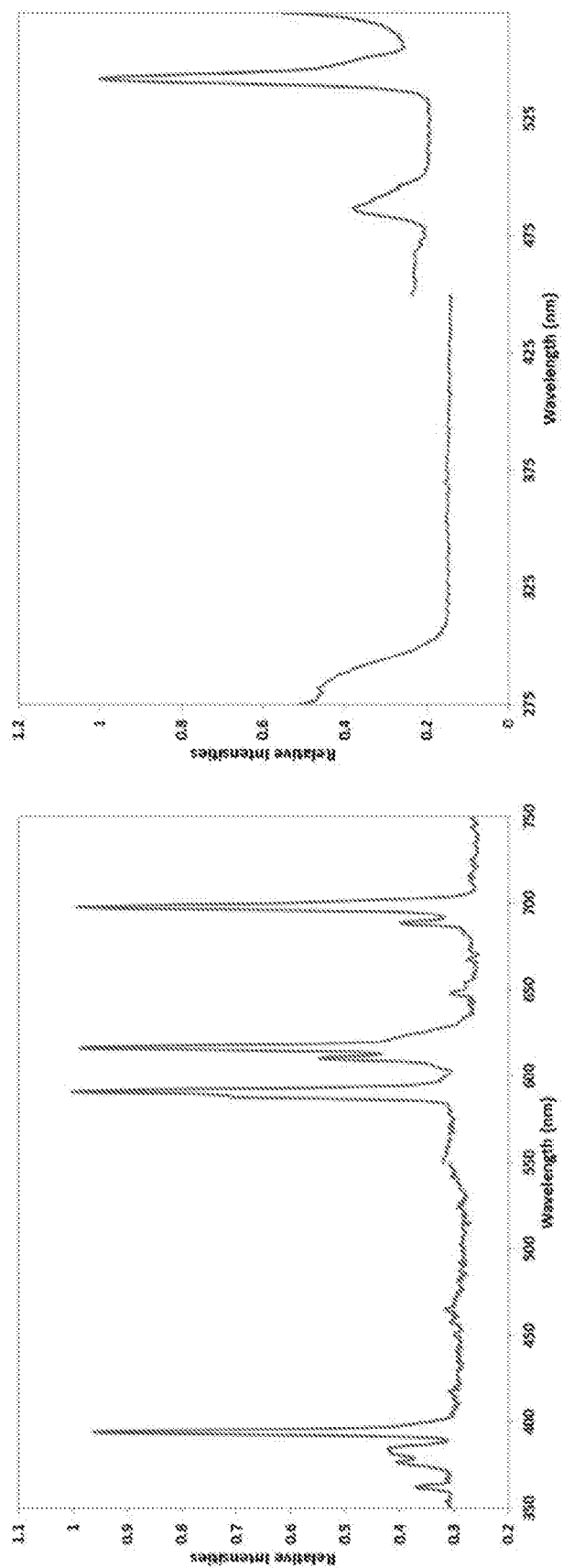
FIGS. 13A&B depict solid state photoluminescence spectra of $[CH(NH_2)_2][Ln(HCOO)_4]$ crystals from fluorescent lamp experiments: (A) $Eu^{3+}$ and (B) $Tb^{3+}$.

Further characterization of the crystals was carried out by photoluminescence spectroscopy and EDX. Photoluminescence spectra were recorded for $Eu^{3+}$ emission (FIG. 13A) and $Tb^{3+}$ emission (FIG. 13B) using excitations at 393 nm and 270 nm, respectively. The presence of $Eu^{3+}$ in the crystal phase was confirmed from the four emission bands at 591, 616, 648 and 698 nm. Two characteristic emission bands of $Tb^{3+}$ were observed at 486 and 542 nm. EDX analysis of the crystals confirmed the presence of yttrium in the crystals.

Several other experiments were performed to optimize the reaction conditions and to improve the yield of extraction. Thus, the impact of formic acid was studied by introducing 0.25 mL of formic acid. As a consequence, the reaction rate increased; crystallization started after 3 d and was a maximum at 5 d. However, the crystal yield remained unchanged.

To improve crystallization yield, we attempted to calcine the phosphor sample. This step was found to have a significant influence on the crystallization of rare earth elements in CRT phosphor powders. Thus, we calcined the fluorescent lamp phosphor at 800° C. for 5 h and compared the yield of crystallization after the formamide reaction. The calcination temperature of the phosphor sample was limited to 800° C., since an unidentified component in the phosphor mixture started to melt at higher temperatures. The crystal yield of the calcined sample with formamide, water and formic acid showed an improvement to ~30% based on the initial weight of the sample after this step.

A similar separation method to the CRT phosphor experiments was used to separate rare earth formate crystals from this experiment. Di-iodoethaneacetone mixtures were used separate low density rare earth crystals from the other residue. However, this separation method was found to have limitations due to the diverse densities of the components present in the fluorescent lamp phosphors.

To overcome the limitations of the separation of products and to improve the crystallization, we tried to implement density separation at the beginning of the process. Hirajima et. al. indicated the feasibility of separating rare earth phosphors from waste fluorescent phosphors using density separation methods.[22-23] As per the report dense rare earth phosphors sink and light halo phosphates float in a di-iodomethane layer. We carried out the separation using 1 g of calcined phosphor mixed with 3 mL of di-iodomethane. The mixture was centrifuged for 1 h. The phosphor sample separated into three different layers. Each layer was filtered and dried in vacuum oven. 0.25 g from each phase was then reacted with formamide/water/formic acid under optimized conditions. After 3 d, of reaction, the vials were cooled down to room temperature, filtered and dried the solid in vacuum oven. As expected the crystallization took place only in the dense rare earth phosphor phase and the final crystal yield was ~60% of the initial weight. No crystallization was observed in any of the other two phases indicating a successful separation and extraction of rare earth constituent from fluorescent phosphor sample.

Figure 14:
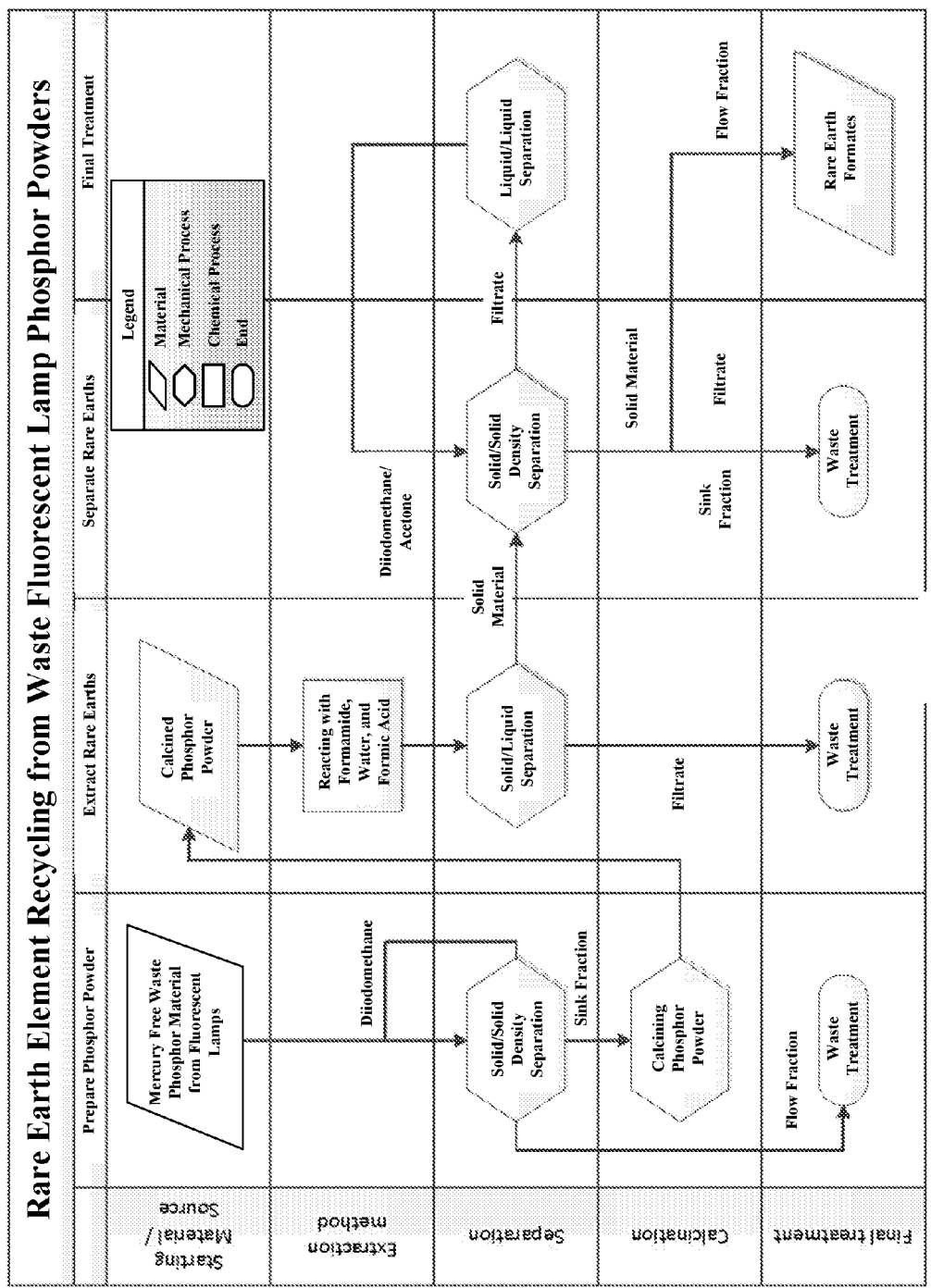
FIG. 14 depicts a flow diagram depicting the process of recovering rare earth constituent from waste fluorescent lamp phosphors.
Figure 15:
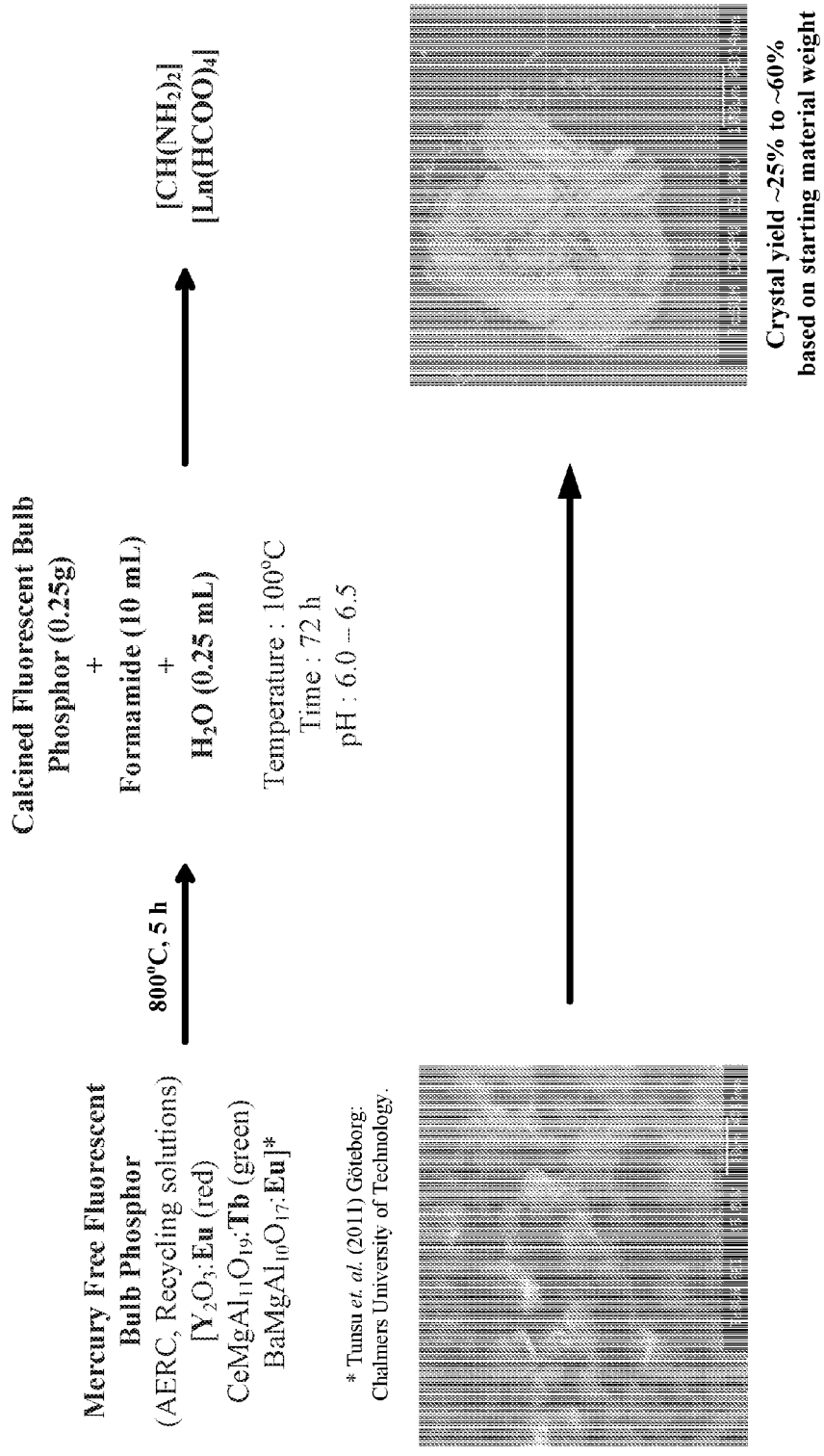
FIG. 15 pictorially depicts the flow diagram of FIG. 14.

The processes or methods are shown in a flow diagram in FIG. 14 and pictorially in FIG. 15. The method includes obtaining mercury free waste phosphor material. The methods also include separating the mercury free waste phosphor material in a solid/solid density separation unit using a density separation medium into a rare earth element rich, mercury free waste phosphor material. The methods also include calcining the rare earth element rich, mercury free waste phosphor material to form a calcined rare earth element rich, mercury free waste phosphor material. The methods also include reacting the calcined rare earth element rich, mercury free waste phosphor material with an extraction system including a formamide, water and formic acid. The methods also include solid/liquid separation to form a solid material. The methods also include separation of the solid material in a solid/solid density separation subsystem using a density separation medium. The methods also include separation of the solid material in to a residual solid material and a rare earth element containing solid material. The methods may also include separating the density separation medium into its constituents for reuse.

Reaction of Rare Earth Magnets from Discarded Hard Drives with Formamide

Most of the modern technological applications such as hybrid electric vehicles to wind turbines to small headphone speakers rely heavily on high-energy, rare earth element (REE) based—neodymium-iron-boron magnets. Thus it is necessary to develop efficient methods to recover REEs from the discarded magnets from end of life electronics. Thus as the next phase of our experiment series, we extended our studies to find the feasibility of recovering the rare earth elements from the scrap Nd—Fe—B magnets.

Nd—Fe—B magnets used here were obtained from discarded hard disk drives (HDDs). These were disassembled manually and 2 to 4 magnets were collected from each HDD. Weights of the magnets were ranged from ~2.5 g to 10 g. As per the first step, the protective surface coating of the magnets were scraped off and removed completely. Then the magnets were broken and ground to very tiny pieces using a mortar and pestle. The pieces were found to have different sizes and they remained connected due to the retaining magnetic force. The sample was characterized by powder X-ray diffraction data. The experimental powder pattern agreed well with X-ray pattern simulated from the crystal structure data for $Nd_2Fe_{14}B$.

Figure 16:
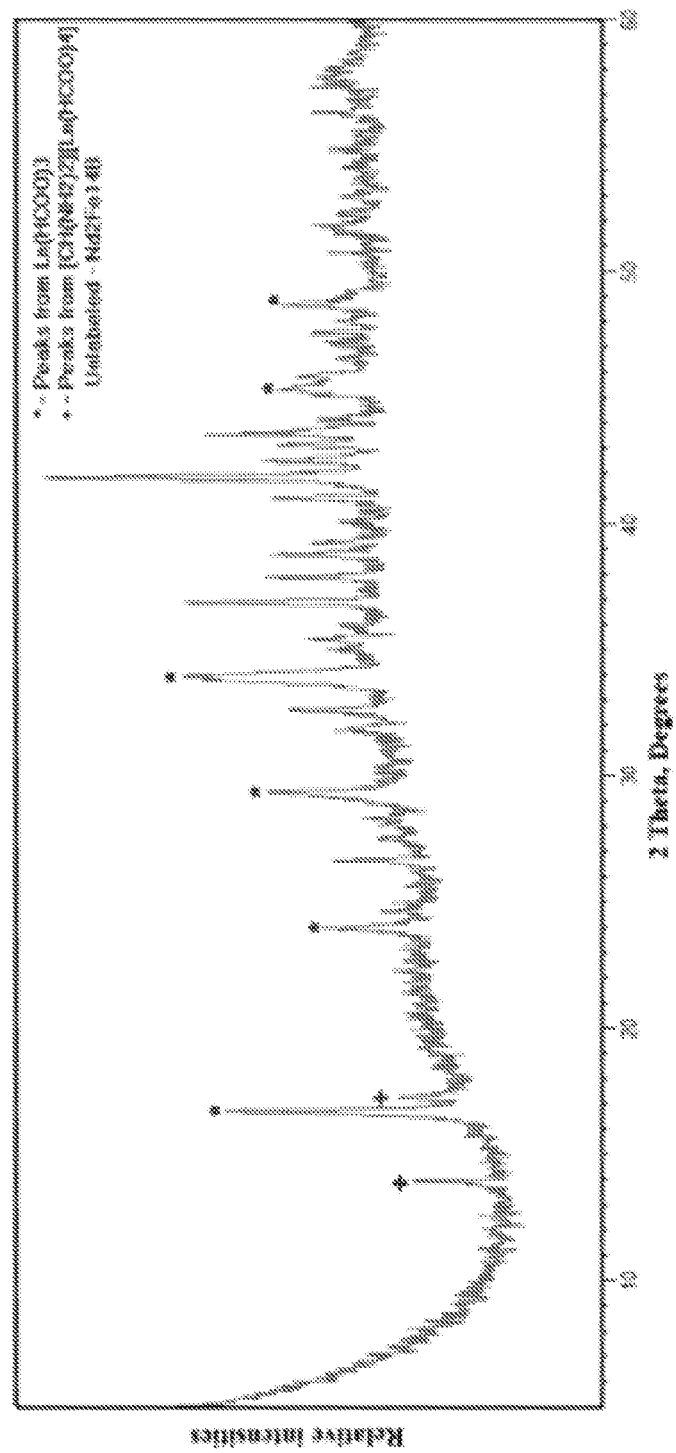
FIG. 16 depicts a powder X-ray diffraction pattern of the solid product from the reaction of fluorescent bulb phosphors Nd—Fe—B magnets and formamide.

In the first phase of experiments, the magnet pieces were reacted directly with formamide. 0.25 g of magnet sample were transferred to a 22 mL vial and mixed with 10 mL of formamide and transferred to 100° C. oven. The reaction was monitored periodically. No obvious dissolution of the starting material was observed for 2 d. The magnets then started to dissolve slowly in the formamide solution and the solution started to turn in to dark grey slurry. The maximum dissolution occurred after about 5 d to 6 d of reaction. The vial was cooled down to room temperature after 7 d, filtered and the solid product was dried in a vacuum oven. The powder X-ray diffraction pattern of the product confirmed the presence of a mixture of $Ln(HCOO)_3$, $[CH(NH_2)_2][Ln(HCOO)_4]$ and unreacted starting material (FIG. 16). This initial experiment confirmed the feasibility of extracting rare earth elements from the scrap magnets.

Figure 17:
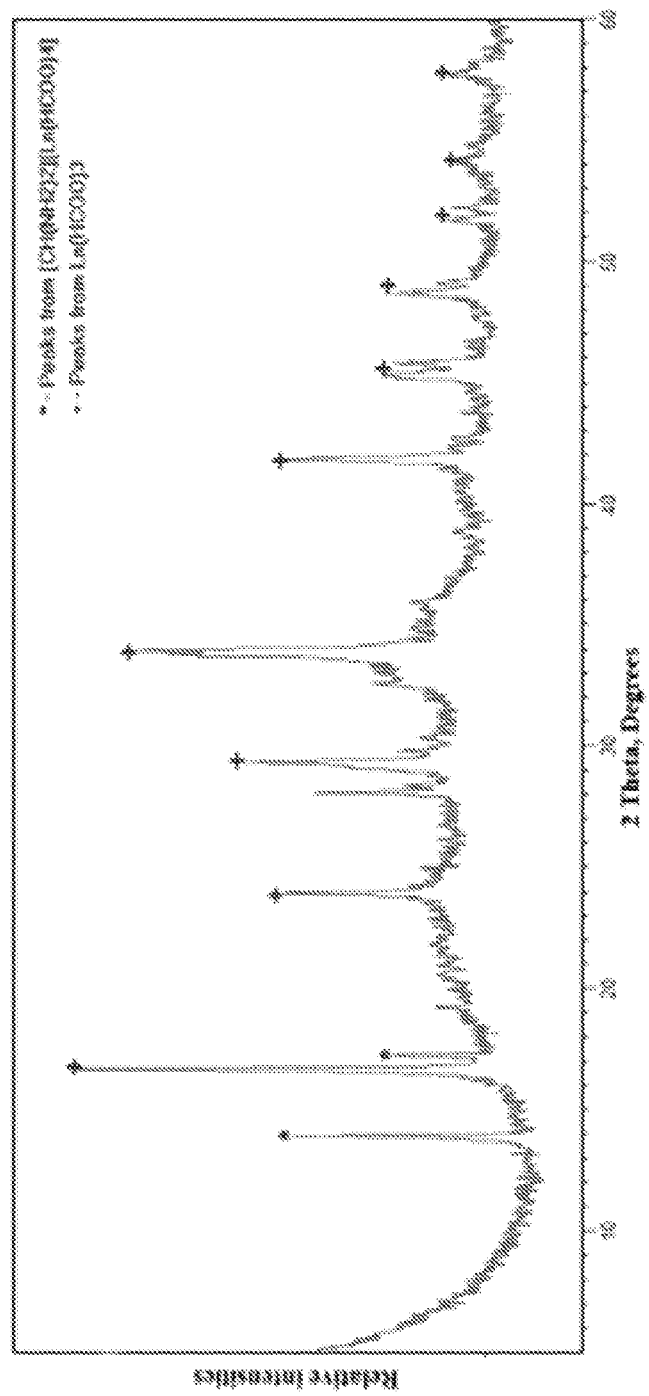
FIG. 17 depicts a powder X-ray diffraction pattern of the solid product from reaction of Nd—Fe—B magnets with water and formamide.

For the next phase of experiments, the reaction conditions optimized for reactions of rare earth oxides with formamide were used as the starting experimental parameters. Thus. 0.25 mL of water was added to a mixture of 10 mL of formamide and 0.25 g of magnet scrap and transferred to 100° C. oven. Addition of an appropriate amount of water to the reaction mixture increased the reaction rate considerably for reactions of rare earth oxides and formamide. As expected, a significant change in the reaction was noticed after 1 d to 2 d of reaction. The starting material started to dissolve and the formamide solution turned an orange-red color. After some time, the formamide started to appear turbulent and an orange-red precipitate started to foam in the reaction vial. The precipitation reached a maximum in 3 d to 4 d. The reaction vial was taken out from the oven after 5 d. The final solution was slightly basic with a pH value of ~8 and distinctive $NH_3$ odor was sensed upon the opening of the sealed vial. The effluent was filtered and the solid was dried in a vacuum oven. Three different phases were identified in the solid mixture using an optical microscope: one phase consisted of pale red color prismatic crystals, the second phase consisted of orange-red powder, and the third phase was the unreacted starting material. A single crystal x-ray diffraction experiment was performed on a crystal of the first phase which was confirmed to be formamidine templated RE formate $[CH(NH_2)_2][Ln(HCOO)_4]$. Unlike the pure RE-formato-formamide crystals, these crystals have a red color most likely due to the incorporation of iron. The majority of the powder phase was confirmed to be a mixture of $Ln(HCOO)_3$ and $[CH(NH_2)_2][Ln(HCOO)_4]$ by powder X-ray diffraction (FIG. 17). Similar to the single crystal phase, the powder phase is also orange-red indicating that it contains iron. A significant amount of starting material also found as the third phase of the solid mixture. The separation of unreacted starting material from the formate products was carried out successfully using a magnet.

Figure 18:
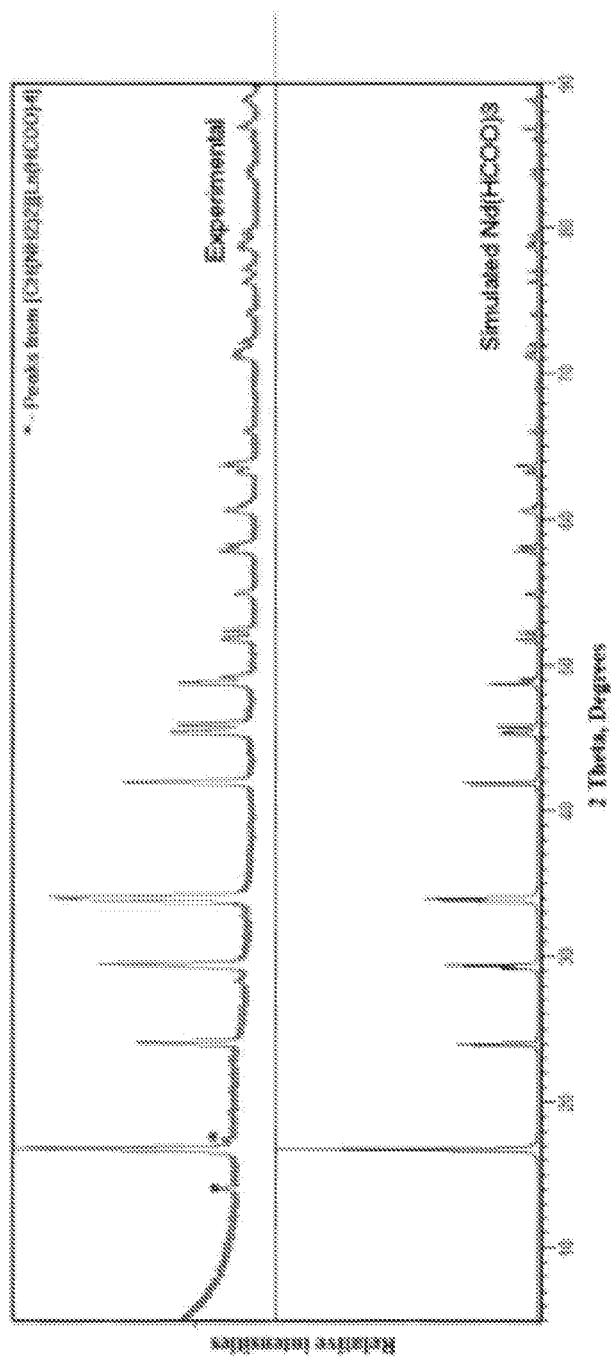
FIG. 18 depicts a comparison of the powder X-ray diffraction pattern of the solid product from reaction of Nd—Fe—B magnets with water, formic acid and formamide reaction (above) and simulated powder pattern of $Nd(HCOO)_3$.

The observations above prompted us to introduce an appropriate amount of formic acid to the reaction mixture to make the environment slightly acidic. Thus 0.25 mL of formic acid was added to 0.25 mL of water, 10 mL of formamide and 0.25 g of magnet particles. On the mixing of the reactants thoroughly, a gas started to evolve which was later confirmed to be $H_2$ gas. The vial was transferred to 100° C. oven and monitored periodically. After about 24 h of reaction, the solution turned red and after several hours the color changed to a pale yellow color confirming a reduction of Fe' to Fe'. Subsequently, a white color precipitate started to foam in the reaction vial. The precipitation was a maximum after 3 d. The vial was then taken out from the oven, filtered and the solid dried in vacuum oven. Unreacted magnetic particles were separated from the precipitate using a magnet. Pale-violet-white precipitate was checked under the microscope to confirm the purity of the phase. Powder X-ray diffraction experiment was performed to identify the product phase. The result was well agreed with $Ln(HCOO)_3$ as the major phase and $[CH(NH_2)_2][Ln(HCOO)_4]$ as a minor phase (FIG. 18). No other impurity peaks were observed in the powder x-ray pattern, thus confirming a successful extraction of pure rare earth formates from the scrap magnets. Based on the assumption of only rare earth element presence in the starting magnet is Nd in the form of $Nd_2Fe_{14}B$ and final product contain only Nd in the form of $Nd(HCOO)_3$, final extracted yield of Nd were calculated as ~50% based on the starting Nd weight.

Additional Reactions of Rare Earth Magnets from Discarded Hard Drives with Formamide Referring now to FIG. 19, a pictorial representation of the method for processing Nd—Fe—B magnets from hard drives is shown. Several experiments were performed to optimize the reaction process of rare earth magnets with formamide.

Demagnetization of the magnets before the crushing step was attempted to avoid the handling difficulty of the small magnet pieces. The magnets were demagnetized by heating at 400° C. for 5 h which is above the Curie temperature of 320° C. of Nd—Fe—B magnets. After the demagnetization, the handling of magnets was easier and could be ground easily to a very fine powder. The use of ground demagnetized powder reduces the reaction time and improves the product yield. However, it has an adverse effect on the purity of the $Ln(HCOO)_3$ in final product. The product after the demagnetization of the starting materials was an orange color indicating some contamination with iron. This demonstrates that the use of magnets without demagnetization gives a higher purity $Ln(HCOO)_3$ product and that the demagnetized magnets can also be used in the rare earth recovery process.

Effect of pH on the reaction was studied by varying the amount of formic acid used in the reaction in the range of pH 6.5-4. The effect was assessed based on the reaction time and the amount of final product. From the experiments, the reaction time slightly decreases at lower pH values, yet the amount of final product was not affected by the pH.

Effect of the amount of water in the reaction mixture was studied by changing the formamide to water volume ratio. From this series of reactions, an increase in the amount of water in the reaction mixture was shown to adversely effect the reaction. A higher volume of water in the reaction mixture results in more iron contamination. The optimum ratio of 10:0.25 of formamide to water is needed to catalyze the reaction.

Reaction of NiMH Battery Anodes with Formamide

Rechargeable nickel metal hydride (NiMH) batteries are important because of their use, in consumer electronics applications and hybrid electric vehicles. Lanthanide based $AB_5$-type alloys (A=mischmetal or a mixture of lanthanides, typically La, Ce, Nd and Pr; B=Ni as the major component) are the most commonly used anode materials in NiMH batteries.[25] A report by the U.S. geological survey states that in 2008, 12,100 tons of rare earth elements were used in NiMH battery alloys.[25] Efficient recycling methods to recover the lanthanides from the anode materials of the end-of-life NiMH batteries are needed. Based our successful extraction of rare earth metals from used phosphors and Nd—Fe—B magnets, we studied the reclamation of lanthanides from anode materials from used NiMH batteries.

A sample of a NiMH battery anode was obtained by disassembling an end-of-life AA size cylindrical battery. The contents of the batteries were separated by removing the outer metal casing and isolating the two electrodes and the electrode separator. The black solid anode material was then scraped from the metal grid and collected. About 8 g of anode material were recovered from the AA size battery. As per the MSDS issued by the manufacturer, this type of a battery consists of 13% w/w or less of mischmetals including lanthanum and cerium as the main rare earth elements. The powder X-ray diffraction pattern indicated the presence of $LaNi_5$ as the main crystalline component.

The anode material was reacted with a formamide/water/formic acid mixture without any pretreatment. Thus 0.25 g of anode material was transferred to a 22 mL vial and mixed with 10 mL of formamide, 0.25 mL of water and 0.25 mL of formic acid and heated at 100° C. After 7 d the vial was cooled to room temperature and the resulting solid filtered out and dried in a vacuum oven. Powder X-ray diffraction of this solid confirmed that only unreacted starting crystalline constituents were present.

Figure 20:
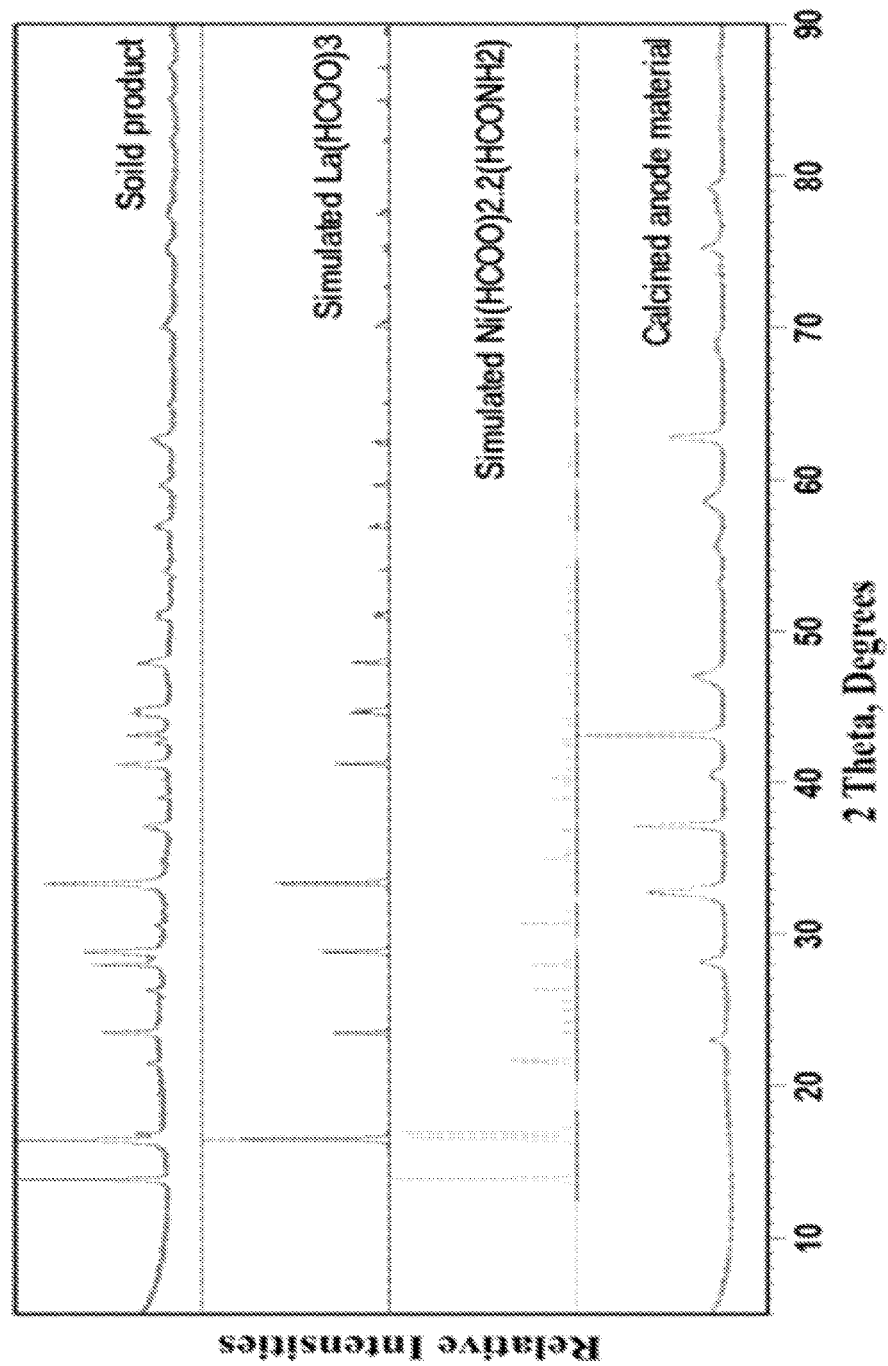
FIG. 20 shows a comparison of the powder X-ray diffraction powder pattern of the solid product from the reaction of calcined NiMH battery anode material with water, formic acid and formamide reaction with simulated powder patterns of $La(HCOO)_3$ and $Ni(HCOO)_2 \cdot 2(HCONH_2)$ and the powder pattern of the starting material.

Previous results on phosphors demonstrated that calcination was required to isolate the rare-earth constituents in the form of oxides and to remove the organic binders. A similar approach was thus used to remove the oraganic binders and convert the rare earth alloy to oxides. The anode material was transferred to an alumina crucible and calcined at 800° C. for 5 h. The resulting powder was characterized by X-ray powder diffraction. The diffraction data confirmed the presence of NiO as a major crystalline constituent in the sample. Several other diffraction peaks were observed from an additional phase. The calcined sample (0.25 g) was transferred to a 22 mL vial and mixed with 10 mL of formamide, 0.25 mL of formic acid and 0.25 mL of $H_2O$ and heated to 100° C. After reaction for 12 h, a very pale green powder started to appear on top of the remaining staring material. As the reaction progressed, the remaining starting material slowly dissolved and the color of the solution changed to pale violet. Within 3 d of reaction, dissolution of starting material and formation of pale green powder were maximized. The vials were heated for another 2 d and then cooled to room temperature. The pale green powder product was carefully separated from the remaining material and dried in a vacuum oven. The diffraction pattern indicated that several phases were present as shown FIG. 20. By comparing the powder pattern with the simulated powder patterns of several possible compounds, we found that $La(HCOO)_3$ or a $La(HCOO)_3$ rich rare earth formate phase was one of the major phases presence in the product phase.[26] This confirms the feasibility of recovering rare earth metals from the anodes of end-of-life NiMH batteries using this method.

Figure 21:
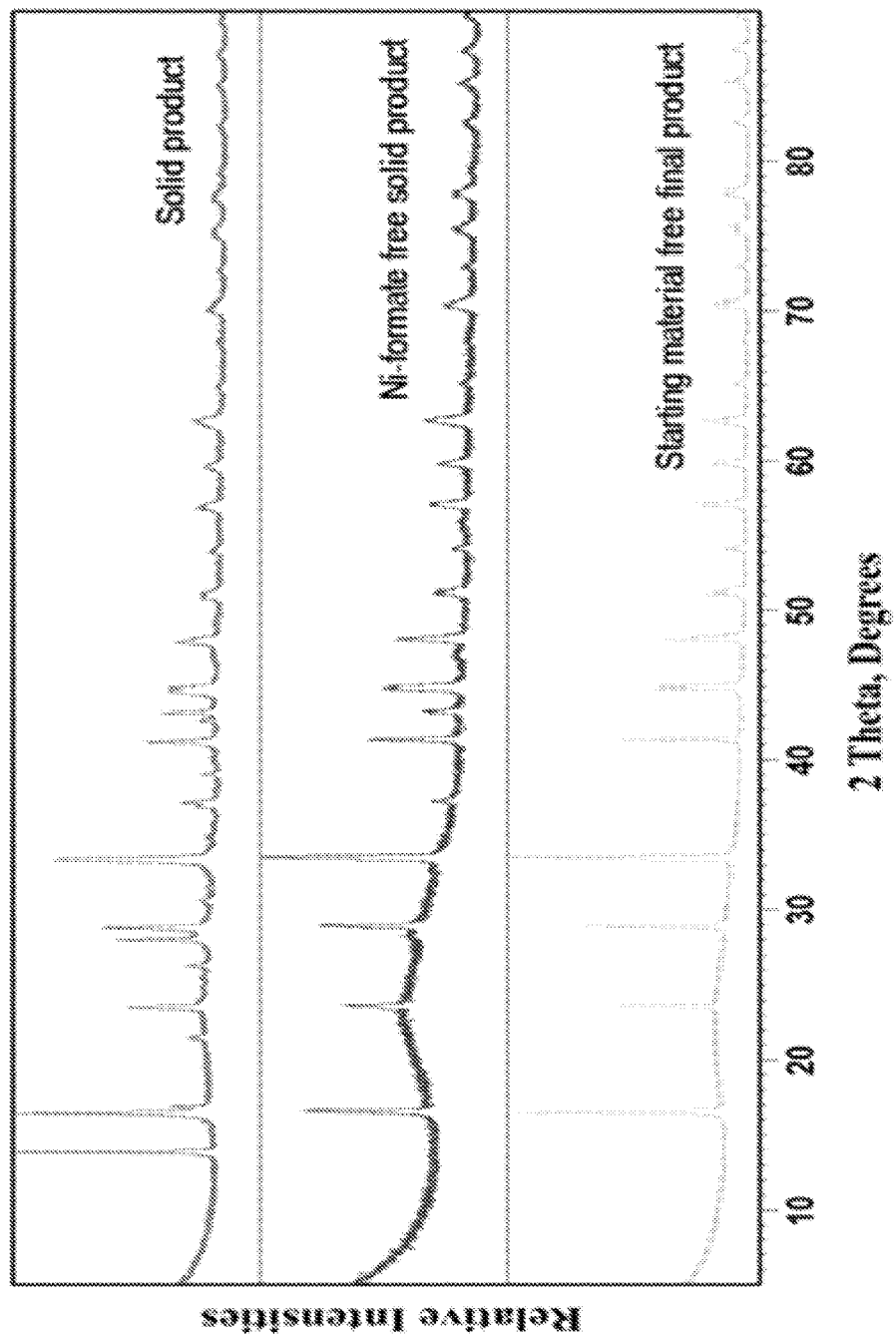
FIG. 21 shows a comparison of the powder X-ray diffraction powder pattern of the solid product from the reaction of calcined NiMH battery anode material with water, formic acid and formamide reaction, with the powder pattern of the solid product after $Ni(HCOO)_2 \cdot 2(HCONH_2)$ removal, and powder pattern of the final solid product after separation of the remaining unreacted starting material.

Further analysis of the diffraction data confirms that a Ni formate phase —$Ni(HCOO)_2.(HCONH_2)_2$ is also present as a major phase.[26] The remaining diffraction peaks were accounted for NiO from unreacted starting material. Because $Ni(HCOO)_2.(HCONH_2)_2$ is water soluble and $La(HCOO)_3$ is insoluble in water the product phase was washed with excess water. Powder X-ray diffraction data from the powder after washing confirmed the total removal of Ni formate phase as shown in FIG. 21. The remaining starting material was separated from $La(HCOO)_3$ by density separation method. The Ni formate free sample was mixed thoroughly with water and then centrifuged for 5 min using a laboratory tabletop centrifuge. The denser particles of the starting material settled as a layer at the bottom of the vial and the relatively less dense particles of $La(HCOO)_3$ settled as a layer on top. The $La(HCOO)_3$ powder was removed carefully and dried in a vacuum oven. The final product was shown by X-ray diffraction to be the $La(HCOO)_3$ phase almost completely free of starting material as shown in FIG. 21. A very small fraction of some impurity particles in this sample were observed under an optical microscope. Thus, further experiments are ongoing to increase the purity of the final product.

The effects of several parameters such as pH, the amount of water in the mixture, mixing of reactants, and particle size of the starting material, are being studied systematically. Effect of pH was studied by systematically varying the amount of formic acid added to the reaction mixture. The amount of formic acid was found to have a minor influence to the reaction but a small amount is necessary to catalyze the overall reaction. Considerable improvement in the dissolution of starting material was achieved by grinding the sample before the reaction and by continuous mixing throughout the reaction period.

Significant effort was made to minimize the precipitation of nickel formato-formamide by optimizing the amount of water in the reaction mixture. As the amount of water increased, nickel formato-formamide started to disappear but another Ni-formate, $[(NH_4)][Ni(HCOO)_3]$ began to appear,[27] which is also soluble in excess of water. Thus, the amount of water in the reaction mixture was further increased. However, at a ratio of 10 mL of formamide:1.5 mL of water, $(NH_4\pm)$ $(HCOO^-)$ started to crystallize from the reaction mixture. It was found that, further increase of the amount of water adversely affected the formation of $La(HCOO)_3$. Thus, washing the final product with water found as the best method to remove impurity phase of Ni formate. The process here confirms the possibility of recovering rare earth constituent of the waste NiMH batteries as $Ln(HCOO)_3$ using formamide as the solvent.

Use of Different Amide Solvent to Recover Rare Earth Metals

As an extension to the method that we have developed to recover rare earth elements from most of the rare earth containing waste materials, we have extended the study to include different amide solvents such as, N-methylformamide (NMF), N-ethylformamide (NEF) and N,N-dimethylformamide(DMF).

Hydrated rare earth nitrates and oxides of four rare earth elements La, Nd, Dy and Y were chosen for the first set of experiments. Similar procedures for hydrated rare earth nitrates and rare earth oxides with formamide were used, but replacing formamide with NMF, NEF and DMF. All the amides reacted similarly to formamide under the experimental conditions. The final products were characterized from the PXRD analysis. The final products of all the reactions were confirmed as $Ln(HCOO)_3$ and no other rare earth formate related phases were observed. This was different from the result of formamide reaction, given that the final products of formamide reactions consisted of $Ln(HCOO)_3$ for La—Nd, $Ln(HCOO)_3.(HCONH_2)_2$ or $[CH_2(NH_2)_2] [Ln(HCOO)_4]$ for Y and Sm—Lu. The use of different amide solvents in the recovery of rare earths in the form of formates was demonstrated.

The results of the experiments of rare earth nitrate and rare earth oxides with different amide solvents prompted us to replicate the remaining experiments. Trichromatic phosphor was chosen as the representative member of the phosphor compounds. The experiments were performed under identical reaction conditions to the formamide reactions. The final products of these reactions were consisted of powder phases and no crystal formations were observed. The PXRD pattern of the final product phase of the trichromatic phosphor with amide confirmed the presence of a mix of $Ln(HCOO)_3$ and unreacted non-rare earth components of the starting material. The possibility of recovering rare earth component form phosphors with different amides was demonstrated.

The next set of experiments was performed to find the feasibility of recovering rare earth elements of Nd—Fe—B magnets using different amides. All the experiments described previously using formamide were repeated, but replacing formamide with NMF, NEF and DMF. All the amides reacted similarly to the formamide resulting $Ln(HCOO)_3$ as final products. A difference was observed in the reaction of NMF with Nd—Fe—B magnets where the final product consisted of significant amount of $[CH_3NH_3]$ [Fe $(HCOO_3]$. The crystals of the $Fe^{2+}$ compounds are water soluble, thus $Ln(HCOO)_3$ can be purely separated by rinsing the final product with water. The red color of the final solutions of all the reactions indicated the presence of Fe' in the solutions. The product yield was lower in all in reaction with amides other than formamide, but the feasibility of recovering rare earth component of Nd—Fe—B magnets using a range of amide solvents was demonstrated.

A similar set of reactions were carried out using NiMH battery anode material with different amide solvents. All the reaction procedures were similar to the initial reactions of formamide with NiMH anode materials. The final products of these reactions were characterized by PXRD analysis which indicated were indicated the formation of $Ln(HCOO)_3$ as a final product and some other phases. In a careful analysis of the final product phase of the NMF reaction, it was found that the residue peaks comes from the $[CH_3NH_3][Ni(HCOO_3]$ compound. However, the residual peaks of the products of NEF and DMF reactions were not identified, yet the result of the formation of $Ln(HCOO)_3$ in all the reactions demonstrates that other amides can be used in recovering rare earths from NiMH anode materials.

REFERENCES OF THE INVENTION

The following references were cited:
1. DoE (2010) Critical Materials Strategy.
2. DoE (2011) Critcal Materials Strategy.
3. Kulkarni P, Chellam S, & Mittlefehldt D W (2007) Microwave] assisted extraction of rare earth elements from petroleum refining catalysts and ambient fine aerosols prior to inductively coupled plasma] mass spectrometry. *Analytica Chimica Acta* 581 (2):247-259.
4. Rabah M A (2007) Recyclables recovery of europium and yttrium metals and some salts from spent fluorescent lamps. *Waste Management* (Amsterdam, Netherlands) 28(2):318-325.
5. Shimizu R, Sawada K, Enokida Y, & Yamamoto I (2005) Supercritical fluid extraction of rare earth elements from luminescent material in waste fluorescent lamps. *Journal of Supercritical Fluids* 33(3): 235-241
6. Bohaty L (1991) Crystal growth, electrooptic and electrostrictive properties of yttrium and erbium formate dihydrates, $Y(HCOO)_3.2H_2O$ (YFD) and $Er(HCOO)_3.2H_2O$ (ErFD). *Zeitschrift fuer Kristallographie* 194(3-4):235-239.
7. Deng S, Zhang N, Xiao W, & Chen C (2009) Crystal structure of neodymium(III) formate, $Nd(HCO_2)_3$. *Zeitschrift fuer Kristallographie—New Crystal Structures* 224(2):275-276.
8. Xu Y, Ding S H, Zhou G P, & Liu Y G (2006) Samarium (III) formate. *Acta Crystallographica, Section E: Structure Reports Online* E62(8):m1749-m1750.
9. Bolotovskii R L, Bolotovskii R L, Bulkin Ap, Krutov G A, Turnov V A, Ul'yanov V A, Anston O, Hiismaki P, Poyry H, Tittla A, Loshmanov A A, & Furmanova N G (1990) Neutron diffraction study of the crystal structure of rareearth and yttrium anhydrous deuterated formates. *Solid State Communications* 76(8):1045-1049.
10. Mayer I, Steinberg M, Feigenblatt F, & Glasner A (1962) The preparation of some rare earth formates and their crystal structures. (Translated from language unavailable) *Journal of Physical Chemistry* 66:1737-1738 (in language unavailable).
11. Zolin V F, Tsaryuk V I, & Markushev V M (1986) Electronic-vibrational spectra of europium (3+) in lanthanide formates. (Translated from Russian) *Koordinatsionnaya Khimiya* 12(11):1498-1503 (in Russian).
12. Atrashevskii Y I, Novitskii G G, Yasyukevich A S, Krasilov Y I, & Portnova S M (1985) Optical transition intensities in spectra of rare earth formates activated by europium (Eu3+). *Zhurnal Prikladnoi Spektroskopii* 43(3):450-454.
13. Atrasheuski Y I & Tsvirko M P (2012) Luminescence efficiency and nonradiative transitions in lanthanide formates. *Journal of Applied Spectroscopy* 79(4):553-558.
14. Silva E N, et al. Moura M R, Ayala A P, Guedes I, Polla G, Vega D R, Tobia D, & Saleta M E (2009) Vibrational modes of rare-earth formates. *Journal of Raman Spectroscopy* 40(8):954-957.
15. Liu B, Zheng H-B, Wang Z-M, & Gao S (2011) Chiral crystalline solids of ammoniumtemplated $Er^{III}$-formate frameworks assembled from three achiral acentric components. *CrystEngComm* 13 (17):5285-5288.
16. Rossin A, Giambastiani G, Peruzzini M, & Sessoli R (2012) Amine-Templated Polymeric Lanthanide Formates: Synthesis, Characterization, and Applications in Luminescence and Magnetism. (Translated from English) *Inorganic Chemistry* (Washington, D.C., United States) 51(12):6962-6968 (in English).
17. Li M, et al. Liu B, Wang B, Wang Z, Gao S, & Kurmoo M (2011) Erbium] formate frameworks templated by diammonium cations: syntheses, structures, structural transition and magnetic properties. *Dalton Transactions* 40(22):6038-6046.
18. Legendziewicz J, Glowiak T, Oczko G, & Dao C N (1986) Spectroscopy studies and crystal structure determination of lanthanide formate bis(formamide) (Ln $(HCOO)_3.2(HCONH_2)$]) crystals. *Journal of the Less] Common Metals* 125:45-57.
19. Ronda C R ed (2008) Luminescence: From theory to applications (Weinheim: Wiley-VCH Verlag GmbH & Co), pp 1-19.
20. Soares M R N, Nico C, Peres M, Fernandes A J S, Monteiro T, & Costa F M (2011) Structural and optical properties of europium doped zirconia single crystals fibers grown by laser floating zone. *Journal of Applied Physics* 109:013516.
21. Liao J, Qiu B, Wen H, Chen J, & You W (2009) Hydrothermal synthesis and photoluminescence of $SrWO_4$: $Tb^{3+}$ novel green phosphor. *Materials Research Bulletin* 44:1863-1866.
22. Hirajima T, Sasakai K, Bissombolo A, Hirai H, Hamada M, & Tsunekawa M (2005) Feasibility of and efficient recovery of rare-earth activated phosphors from waste fluorescent lamps through dense medium centifrudge. *Separation and Purification Technology* 44:197-204.
23. Hirajima T, Bissombolo A, Sasakai K, Nakayama K, Hirai H, & Tsunekawa M (2005) *Floatability of rare earth phosphors from waste fluorescent lamps*. *International Journal of Mineral Processing* 77:187-198.
24. Endo D, Akiba E (2006) Substitution Effect of Rare Earth on Hydrogenation for $AB_5$-Type Alloys. *Materials Transaction; The Japan Institute of Metals* 47(8):1914-1917.
25. Goonan, T. G. (2011) Rare earth elements—End use and recyclability: U.S. Geological Survey Scientific Investigations Report 2011-5094, 15 p. available only at http://pubs.usgs.gov/sir/2011/5094/.
26. Samarasekere P, Wang X, Jacobson A J, Tapp J, & Möller A (2014) Synthesis, crystal structures, magnetic, and thermal properties of divalent metal formate-formamide layered compounds. *Inorganic chemistry* 53, 244-256.
27. Wang Z, Zhang B, Inoue K, Fujiwara H, Otsuka T, Kobayashi H, Kurmoo M (2007) Occurrence of a Rare $4^9 \cdot 6^6$ Structural Topology, Chirality, and Weak Ferromagnetism in the $[NH_4][M^{II}(HCOO)_3]$ (M=Mn, Co, Ni) Frameworks. *Inorganic chemistry* 46: 437-45.

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

We claim:

1. A composition comprising:
  a material including rare earth elements, a rare earth element crystallization medium, and rare earth metal crystals,
  where the rare earth metal crystals comprise rare earth metal formates or rare earth metal oxides and where the crystallization medium comprises 80 vol. % to 100 vol. % of at least one amide, 0 vol. % to 10 vol. % of at least one organic acid, and 0 vol. % to 10 vol. % water.

2. The composition of claim 1, wherein the at least one amide is selected from the group consisting of formamide, an N-carbylformamide, an N,N-dicarbylformamide, and mixtures or combinations thereof, where the carbyl group are the same or different and are selected from the group consisting of linear or branched alkyl groups having between 1 and 6 carbon atoms, aryl groups, araalkyl groups, alkaaryl group, or mixture thereof and wherein the at least one organic acid is selected from the group consisting of formic acid, acetic acid, propanoic acid and mixtures or combinations thereof.

3. The composition of claim 1, wherein the crystallization medium comprises formamide, formic acid and water.

4. The composition of claim 3, wherein a volume ratio of the formamide to formic acid to water is 10:0.25:0.25.

5. A method for recovering rare earth elements from a material including containing rare earth elements comprising:
  adding the material and a rare earth element crystallization medium into a temperature and pressure controlled vessel under solvothermal conditions sufficient to selectively crystallize the rare earth elements to form a rare earth metal crystals capable of being gravity separated,
  where the crystallization medium comprises 80 vol. % to 100 vol. % of at least one amide, 0 vol. % to 10 vol. % of at least one organic acid, and 0 vol. % to 10 vol. % water.

6. The method of clam 5, further comprising:
  gravity separating the rare earth metal crystals to form a rare earth crystalline solid composition.

7. The method of clam 6, further comprising:
  purifying the rare earth metal crystalline solid composition.

8. The method of claim 7, further comprising:
  post-calcining the rare earth crystalline solid composition into purified rare earth metal oxides.

9. The method of claim 5, further comprising:
  pre-calcining the material prior to adding the material to the temperature and pressure controlled vessel.

10. The method of claim 5, wherein the at least one amide is selected from the group consisting of formamide, an N-carbylformamide, anN,N-dicarbylformamide, and mixtures or combinations thereof, where the carbyl group are the same or different and are selected from the group consisting of linear or branched alkyl groups having between 1 and 6 carbon atoms, aryl groups, araalkyl groups, alkaaryl group, or mixture thereof and wherein the at least one organic acid is selected from the group consisting of formic acid, acetic acid, propanoic acid and mixtures or combinations thereof.

11. The method of claim 5, wherein the crystallization medium comprises formamide, formic acid and water.

12. The method of claim 11, wherein a volume ratio of the formamide to formic acid to water is 10:0.25:0.25.

13. A method for recovering rare earth elements from a material including containing rare earth elements comprising:
mixing the material with a rare earth element crystallization medium in a temperature and pressure controlled vessel under solvothermal conditions sufficient to selectively crystallize the rare earth elements to form rare earth metal crystals capable of being gravity separated, and
gravity separating the rare earth metal crystals to form a rare earth crystalline solid composition,
where the crystallization medium comprises 80 vol. % to 100 vol. % of at least one amide, 0 vol. % to 10 vol. % of at least one organic acid, and 0 vol. % to 10 vol. % water.

14. The method of clam 13, further comprising:
purifying the rare earth metal crystalline solid composition.

15. The method of claim 14, further comprising:
post-calcining the rare earth crystalline solid composition into purified rare earth metal oxides.

16. The method of claim 13, further comprising:
pre-calcining the material prior to adding the material to the temperature and pressure controlled vessel.

17. The method of claim 13, wherein the at least one amide is selected from the group consisting of formamide, an N-carbylformamide, an N,N-dicarbylformamide, and mixtures or combinations thereof, where the carbyl group are the same or different and are selected from the group consisting of linear or branched alkyl groups having between 1and 6 carbon atoms, aryl groups, araalkyl groups, alkaaryl group, or mixture thereof and wherein the at least one organic acid is selected from the group consisting of formic acid, acetic acid, propanoic acid and mixtures or combinations thereof.

18. The method of claim 13, wherein the crystallization medium comprises formamide, formic acid and water.

19. The method of claim 18, wherein a volume ratio of the formamide to formic acid to water is 10:0.25:0.25.

20. A process for recovering rare earth elements from cathode ray tube (CRT) phosphors comprising:
obtaining CRT monitors,
removing phosphor material from CRT lenses to form a powered phosphor material,
calcining the powered phosphor material to form a calcined phosphor material,
reacting the calcined phosphor material with a rare earth element crystallization medium,
solid/liquid separating in a solid/liquid separator to form a solid material,
separating the solid material in a solid/solid density separator using a density separation medium, and
separating the solid material into a residual solid material and a rare earth element containing solid material,
where the crystallization medium comprises 80 vol. % to 100 vol. % of at least one amide, 0 vol. % to 10 vol. % of at least one organic acid, and 0 vol. % to 10 vol. % water.

21. The method of claim 19, further comprising:
separating the density separation medium into its constituents for reuse.

22. The process of claim 20, wherein the crystallization medium comprises formamide, formic acid and water.

23. The process of claim 22, wherein a volume ratio of the formamide to formic acid to water is 10:0.25:0.25.

24. A process for recovering rare earth elements from a mercury free waste phosphor material comprising:
obtaining a mercury free waste phosphor material,
separating the mercury free waste phosphor material in a solid/solid density separator using a density separation medium into a rare earth element rich, mercury free waste phosphor material,
calcining the rare earth element rich, mercury free waste phosphor material to form a calcined rare earth element rich, mercury free waste phosphor material,
reacting the calcined rare earth element rich, mercury free waste phosphor material with a rare earth element crystallization medium to form rare earth element crystals,
solid/liquid separating in a solid/liquid separator to form a solid material, and
separating the solid material in a solid/solid density separator using a density separation medium to form a rare earth element containing solid material,
where the crystallization medium comprises 80 vol. % to 100 vol. % of at least one amide, 0 vol. % to 10 vol. % of at least one organic acid, and 0 vol. % to 10 vol. % water.

25. The process of claim 24, further comprising:
separating the density separation medium into its constituents for reuse.

26. The process of claim 24, wherein the crystallization medium comprises formamide, formic acid and water.

27. The process of claim 26, wherein a volume ratio of the formamide to formic acid to water is 10:0.25:0.25.

28. A process for recovering rare earth elements from NiMH batteries comprising:
obtaining rare earth containing battery material,
comminuting the battery material to form a comminuted magnetic material,
reacting the comminuted battery material with a rare earth element crystallization medium to form rare earth element crystals,
solid/liquid separating in a solid/liquid separator to form a solid material,
separating the solid material in a solid/solid magnetic separator using a magnetic field to form a rare earth element containing solid material and/or separating the solid material in a solid/solid density separator using a density separation medium to form a rare earth element containing solid material,
where the crystallization medium comprises 80 vol. % to 100 vol. % of at least one amide, 0 vol. % to 10 vol. % of at least one organic acid, and 0 vol. % to 10 vol. % water.

29. The process of claim 28, wherein the crystallization medium comprises formamide, formic acid and water.

30. The process of claim 29, wherein a volume ratio of the formamide to formic acid to water is 10:0.25:0.25.

31. A process for recovering rare earth elements from magnets comprising:
obtaining magnets for hard disk drives,
comminuting the magnets to form a comminuted magnetic material,
reacting the comminuted magnetic material with a rare earth element crystallization medium to form rare earth element crystals,
solid/liquid separating in a solid/liquid separator to form a solid material, separating the solid material in a solid/solid magnetic separator using a magnetic field to form a rare earth element containing solid material, where the crystallization medium comprises 80 vol. % to 100 vol. % of at least one amide, 0 vol. % to 10 vol. % of at least one organic acid, and 0 vol. % to 10 vol. % water.

32. The process of claim 31, wherein the crystallization medium comprises formamide, formic acid and water.

33. The process of claim 32, wherein a volume ratio of the formamide to formic acid to water is 10:0.25:0.25.

* * * * *